US007580466B2

United States Patent
Ido

(10) Patent No.: US 7,580,466 B2
(45) Date of Patent: Aug. 25, 2009

(54) DEMODULATION DEVICE AND DEMODULATION METHOD

(75) Inventor: Jun Ido, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 638 days.

(21) Appl. No.: 10/555,530

(22) PCT Filed: Dec. 19, 2003

(86) PCT No.: PCT/JP03/16298

§ 371 (c)(1),
(2), (4) Date: Nov. 3, 2005

(87) PCT Pub. No.: WO2004/100413

PCT Pub. Date: Nov. 18, 2004

(65) Prior Publication Data

US 2007/0036231 A1 Feb. 15, 2007

(30) Foreign Application Priority Data

May 12, 2003 (JP) .............................. 2003-132544

(51) Int. Cl.
*H04K 1/10* (2006.01)

(52) U.S. Cl. .................. 375/260; 375/136; 375/145; 375/149; 375/350; 375/362

(58) Field of Classification Search ................. 375/260, 375/136, 145, 149, 350, 355, 362
See application file for complete search history.

(56) References Cited

U.S. PATENT DOCUMENTS

| 5,946,292 A * | 8/1999 | Tsujishita et al. ........... 370/204 |
| 7,020,074 B1 * | 3/2006 | Rickard et al. .............. 370/210 |
| 7,215,636 B2 * | 5/2007 | Seo et al. ..................... 370/208 |
| 2003/0063678 A1 * | 4/2003 | Crawford ..................... 375/260 |
| 2006/0239178 A1 * | 10/2006 | Svensson et al. ............ 370/208 |
| 2006/0291578 A1 * | 12/2006 | Singh et al. .................. 375/260 |

FOREIGN PATENT DOCUMENTS

| JP | 10-075226 A | 3/1998 |
| JP | 2000-332727 A | 11/2000 |
| JP | 2001-292125 A | 10/2001 |
| JP | 2001-308760 A | 11/2001 |
| JP | 2002-064413 A | 2/2002 |
| JP | 2002-261729 A | 9/2002 |
| JP | 2002-300131 A | 10/2002 |

* cited by examiner

*Primary Examiner*—Shuwang Liu
*Assistant Examiner*—Kabir A Timory
(74) *Attorney, Agent, or Firm*—Birch, Stewart, Kolasch & Birch, LLP

(57) ABSTRACT

The present invention relates to a demodulation device and a demodulation method, and its object is to demodulate subcarrier components utilizing estimated delay profiles to control the timing for performing a Fourier transform and the pass band of an interpolation filter used in interpolating transmission channel characteristics along a frequency axis so as to suppress unnecessary noise components, whereby an error rate after the demodulation is reduced. To achieve the object, in a demodulation device according to the present invention, a Fourier transform unit 1 performs a Fourier transform according to a timing signal and an interpolation filter unit 18 sets a pass band of a frequency interpolation filter used for interpolation along the frequency axis based on a signal corresponding to a maximum delay time, whereby the frequency band of a transmission channel characteristic corresponding to a subcarrier component is restricted when it is output.

19 Claims, 11 Drawing Sheets

F I G . 7
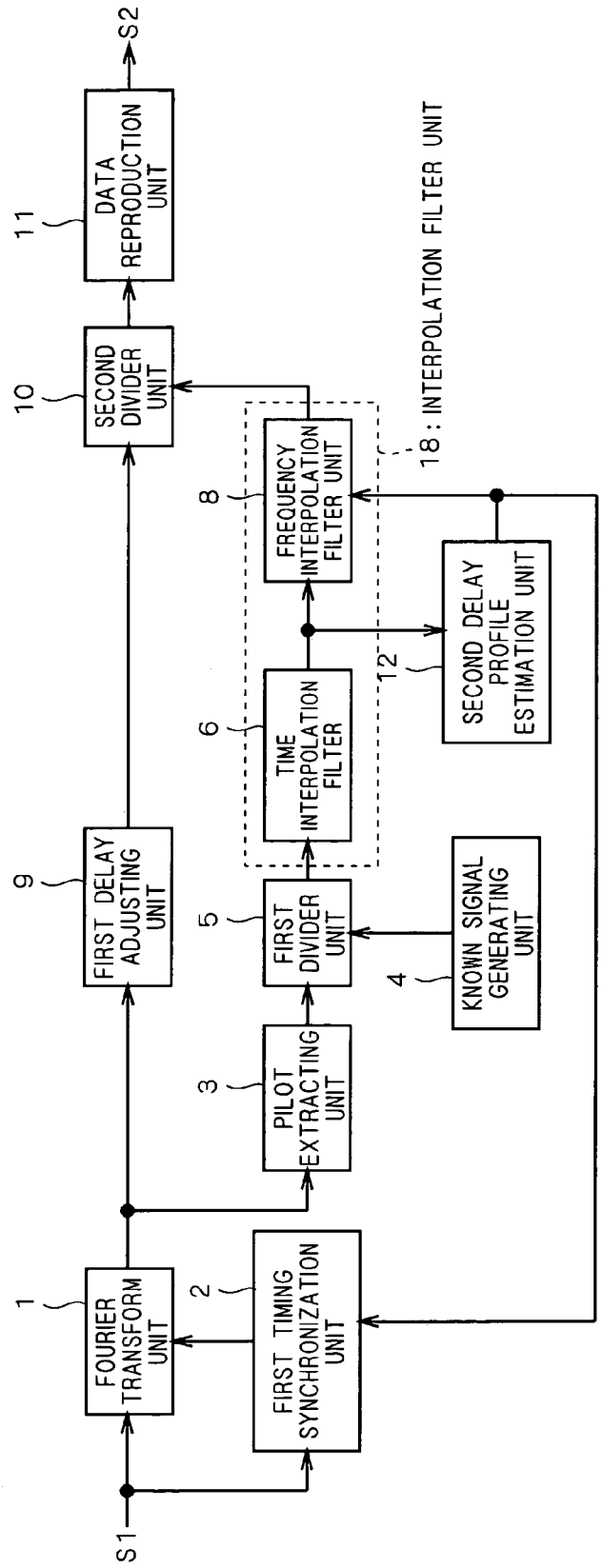

(a)

(b)

(c)

(A) THE INTERSYMBOL INTERFERENCE OCCURRENCE
REGION OF FIRST PREFERRED EMBODIMENT (B) THE INTERSYMBOL INTERFERENCE OCCURRENCE
REGION OF FOURTH PREFERRED EMBODIMENT

DEMODULATION DEVICE AND DEMODULATION METHOD

TECHNICAL FIELD

The present invention relates to a demodulation device and a demodulation method for orthogonal frequency division multiplex signal (hereinafter also referred to as "OFDM signal").

BACKGROUND OF THE INVENTION

A conventional OFDM signal demodulation device performs demodulation of OFDM signals in the following manner.

Specifically, the demodulation device performs a Fourier transform on a received OFDM signal with a Fourier transform circuit to obtain a Fourier transform signal. It also generates a pilot signal that synchronizes with the Fourier transform signal with a pilot signal generating circuit.

The Fourier transform signal is divided by the pilot signal at a divider, and thereby a transmission channel characteristic corresponding to the pilot signal is computed. Meanwhile, a delay time calculation circuit computes a maximum delay time in delay wave components in the received OFDM signal. A Doppler frequency calculation circuit computes a magnitude of transmission channel characteristic associated with time variation, based on the OFDM signal.

The demodulation device filters the transmission channel characteristic that is the output from the divider based on the calculation result of the delay time calculating circuit and the calculation result of the Doppler frequency-computing circuit by a variable bandwidth filter and calculates transmission channel characteristics for all the subcarrier components. It also obtains a demodulated signal by dividing the Fourier transform signal by the output from the variable bandwidth filter.

(For example, Japanese Patent Application Laid-Open No. 10-75226 (Patent Document 1))

The OFDM signal demodulation device as described above takes only the maximum delay time of the delay wave into account in filtering the transmission channel characteristics along a frequency axis, and does not take timing information for performing a Fourier transform into account. For that reason, the pass band of the variable bandwidth filter used for the filtering along the frequency axis may become unnecessarily wide, increasing noise that is other than desired signals. Accordingly, a problem in the conventional OFDM signal demodulation device has been that it is unable to attain sufficient noise suppression effect and is thus unable to sufficiently reduce the error rate obtained after the OFDM signal is demodulated.

SUMMARY OF THE INVENTION

The present invention has been accomplished to resolve the problem such as described above, and its object is to provide a demodulation device and a demodulation method that utilize estimated delay profiles (which refers to information corresponding to the delay wave under multipath environment (delay time, power value, and so forth)) to control timing for performing the Fourier transform and the pass band of an interpolation filter used in interpolating the transmission channel characteristics along a frequency axis so as to suppress unnecessary noise components in demodulating subcarrier components, whereby an error rate obtained after the demodulation is reduced.

An embodiment of a demodulation device according to the present invention includes: a Fourier transform unit for performing a Fourier transform on a received OFDM signal to output a subcarrier component obtained as a result of the Fourier transform; a pilot signal-extracting unit for extracting a pilot signal contained in the subcarrier component output from the Fourier transform unit; a known signal generating unit for generating and outputting a known signal corresponding to the pilot signal; a first divider unit for dividing the pilot signal output from the pilot signal-extracting unit by the known signal output from the known signal generating unit to calculate a transmission channel characteristic corresponding to the pilot signal; a delay profile estimation unit for estimating a delay profile based on the transmission channel characteristic of the pilot signal output from the first divider unit, and outputting a signal corresponding to a maximum delay time in the delay profile and a signal corresponding to a minimum delay time in the delay profile; an interpolation filter unit for performing interpolation on the transmission channel characteristic of the pilot signal output from the first divider unit along a time axis and along a frequency axis, and outputting a transmission channel characteristic corresponding to the subcarrier component; a timing synchronization unit for outputting a timing signal that controls timing for performing Fourier transform in the Fourier transform unit based on a signal corresponding to the minimum delay time output from the delay profile estimation unit and the OFDM signal; and a second divider unit for dividing the subcarrier component output from the Fourier transform unit by a transmission channel characteristic corresponding to the subcarrier component output from the interpolation filter unit, to output a demodulated signal, the demodulation device characterized in that: the Fourier transform unit performs the Fourier transform according to the timing signal; and the interpolation filter unit sets a pass band of a frequency interpolation filter used for the frequency axis interpolation based on the signal corresponding to the maximum delay time, and restricts a frequency band of the transmission channel characteristic corresponding to the subcarrier component while it is being output.

According to the embodiment of the demodulation device according to the present invention, it is possible to alleviate deterioration of reception performance originating from the passage of undesired noise components through the interpolation filter. Moreover, the embodiment of the demodulation device according to the present invention is configured to estimate a delay profile utilizing a pilot signal after the Fourier transform and therefore an effect is that it can estimate the delay profile with high accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram illustrating a configuration example of a demodulation device according to a second preferred embodiment of the present invention.

BEST MODE FOR CARRYING OUT THE INVENTION

Figure 1:
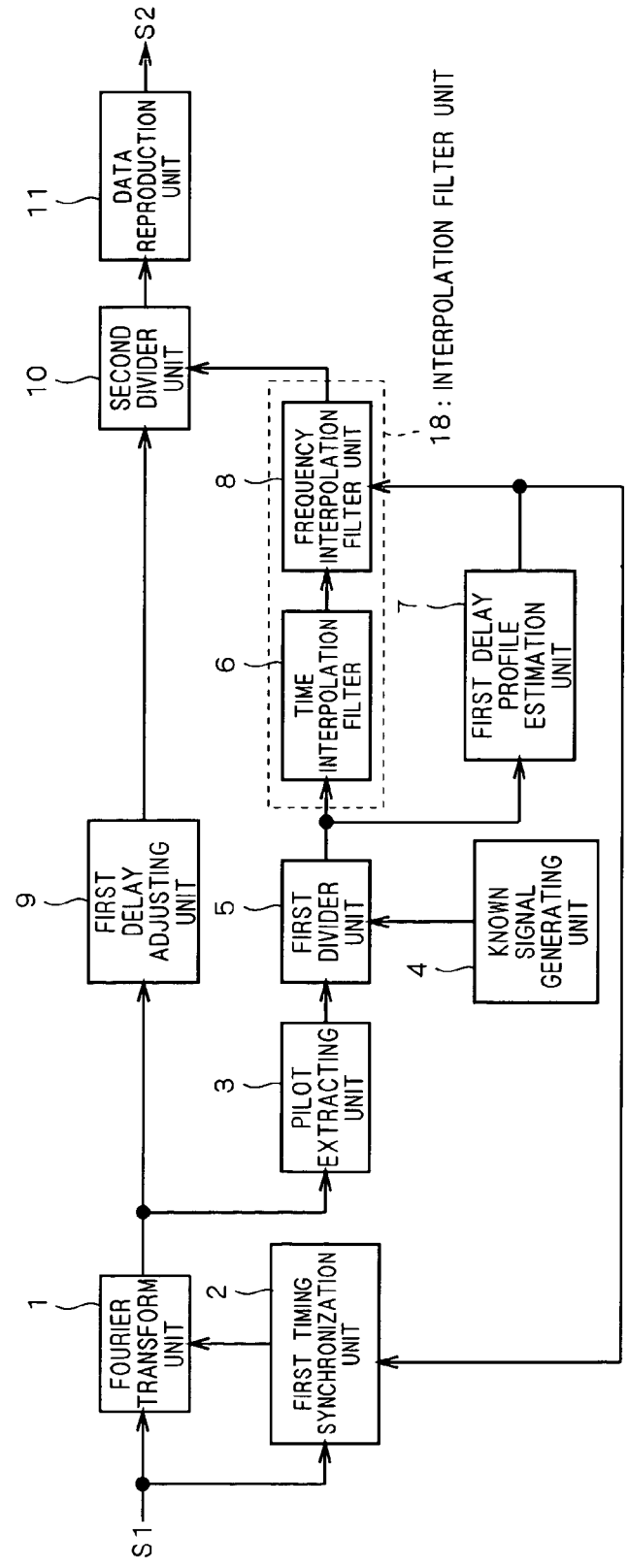
FIG. 1 is a block diagram showing a configuration example of the demodulation device according to a first preferred embodiment of the present invention.

Hereinbelow, application examples of the present invention are discussed with reference to preferred embodiments; however, prior to the discussion, an OFDM transmission system will be described.

An OFDM transmission system is a transmission system in which transmission data are modulated and transmitted with a transmission device and the transmission data are received and demodulated with a receiver device, by using a plurality of carrier waves (hereinafter also referred to as "subcarrier components") whose frequencies are orthogonal to each other.

In a system employing the OFDM transmission system, the transmission device allocates transmission data to a signal constellation according to each modulation method of subcarrier components. Next, each of the subcarrier components is subjected to inverse Fourier transform, and further, a plurality of subcarrier components the frequencies of which are orthogonal to each other are multiplexed to generate a signal. Thereafter, a portion of the tail end of the signal that has been multiplexed (multiplex signal) is added to the front edge of the multiplex signal as a guard interval. Then, the multiplex signal to which the guard interval has been add is frequency-converted into a predetermined frequency band and transmitted.

On the other hand, with the receiver device, the received OFDM signal is frequency-converted into a predetermined frequency band, and the position of the guard interval is identified to establish synchronization. Next, a length of signal corresponding to the guard interval is removed from each of the symbols in the OFDM signal; thereafter each of the symbols is Fourier transformed to calculate the subcarrier components, and the calculated subcarrier components are demodulated to reproduce the transmission data.

The demodulation of subcarrier components are performed by calculating the amounts of change in the amplitude and phase of the subcarrier component and reproducing the signal constellation at the time of transmission based on the calculation result. Generally, in order to facilitate calculation of the amounts of changes in amplitude and phase, a method is widely used in which a known signal (pilot signal) that serves as the reference of calculation of the amounts of change is transmitted using a specific subcarrier component. For example, in a digital terrestrial TV broadcasting system in Japan, a pilot signal is periodically inserted every 12 subcarrier components along the frequency axis and every 4 symbols along the time axis, so that the receiver device calculates the amounts of changes in amplitude and phase based on the pilot signal and demodulate the subcarrier components. In the digital terrestrial TV broadcasting system in Japan, the pilot signal is referred to as a scattered pilot signal. Hereinbelow, for convenience in the description, a pilot signal that is to be inserted into an OFDM signal with the transmission device is also referred to as a "transmission pilot signal," whereas a pilot signal that is in an OFDM signal received by the receiver device is also referred to as a "received pilot signal."

First Preferred Embodiment

FIG. 1 is a block diagram showing a configuration example of a demodulation device according to the present preferred embodiment. In FIG. 1, a Fourier transform unit 1 performs a Fourier transform on a signal obtained by frequency-converting a received OFDM signal into a predetermined signal band (the signal is hereinafter also referred to as "S1") based on a timing signal that is input from a later-described first timing synchronization unit 2, and outputs a subcarrier component contained in S1 to a pilot extracting unit 3 and a first delay adjusting unit 9. The pilot extracting unit 3 extracts a received pilot signal contained in the subcarrier component.

Since a transmission pilot signal that has been inserted in an OFDM signal with a transmission device is preset in the demodulation device as a known signal, the demodulation device can compute a transmission channel characteristic corresponding to the received pilot signal by comparing the received pilot signal with the transmission pilot signal, which is the known signal. Specifically, a known signal generating unit 4 generates and outputs a transmission pilot signal with the timing in synchronization with an output from the pilot extracting unit 3, and then, a first divider unit 5 divides the received pilot signal that is output from the pilot extracting unit 3 by the transmission pilot signal that is output from the known signal generating unit 4, thereby calculates a transmission channel characteristic corresponding to each received pilot signal, and outputs the calculated transmission channel characteristic to a time interpolation filter unit 6 in an interpolation filter unit 18 and to a first delay profile estimation unit 7.

The transmission channel characteristics calculated by the first divider unit 5 can be obtained only for the received pilot signals, and therefore, an interpolation process by filtering is required to obtain the transmission channel characteristics for all the subcarrier components. In the following, the necessity of the interpolation process will be specifically described.

Figure 2:
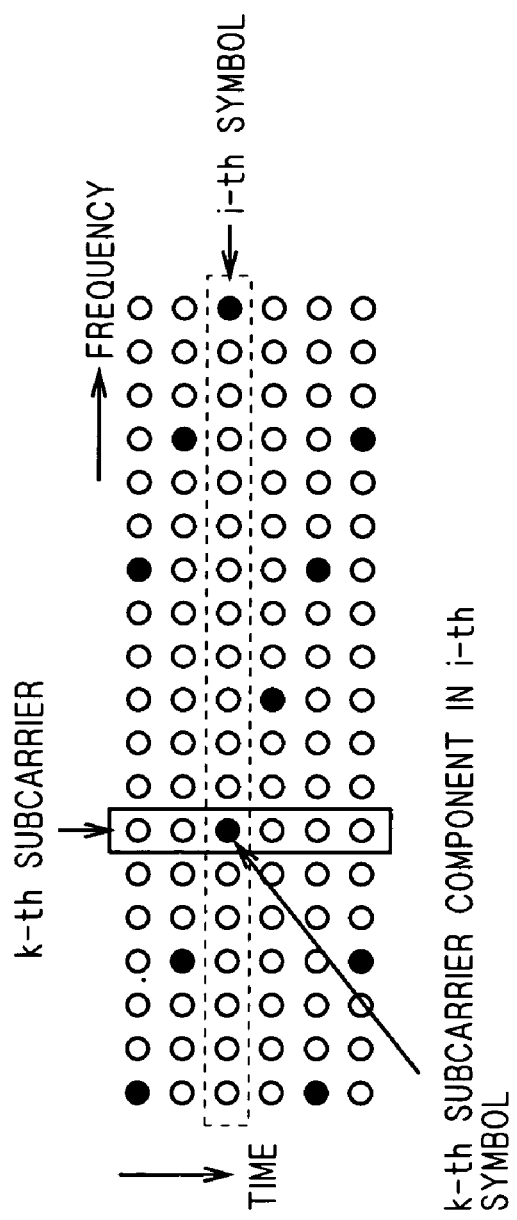
FIG. 2 is an arrangement diagram of a pilot signal according to the first preferred embodiment of the present invention.

FIG. 2 illustrates the arrangement of a pilot signal in an OFDM signal used in a digital terrestrial TV broadcasting system in Japan. In FIG. 2, the horizontal axis represents frequency axis while the vertical axis represents time axis, respectively, and black dots represents pilot signals while white dots represent subcarrier components other than the pilot signals, respectively. Also, a portion surrounded by the solid line represents a k-th subcarrier, a portion surrounded by the dashed line represents an i-th symbol, and a portion at which the portion surrounded by the solid line intersects with the portion surrounded by the dashed line represents a k-th subcarrier component in the i-th symbol. As shown in FIG. 2, a pilot signal is inserted at every 12 subcarrier components along the frequency axis and at every 4 symbols along the time axis. Accordingly, interpolation processes for the time axis and the frequency axis are generally necessary to compute the transmission channel characteristics for all the subcarrier components from the transmission channel characteristics calculated based on these pilot signals.

The time interpolation filter unit 6 performs, of the foregoing interpolation processes, an interpolation process along the time axis transmission channel characteristics corresponding to the received pilot signals that are output from the first divider unit 5. In the time interpolation filter unit 6, by interpolating the transmission channel characteristics corresponding to the received pilot signals along the time axis, the transmission channel characteristics corresponding to the subcarrier frequency components containing the pilot signals are obtained. Then, the time interpolation filter unit 6 outputs the results of the interpolation process along the time axis to a frequency interpolation filter unit 8.

Of the foregoing interpolation processes, the interpolation process along the frequency axis is performed in the frequency interpolation filter unit 8. Here, the filtering characteristics of the frequency interpolation filter unit 8 are sufficient when it has such a pass band that incoming wave components can pass through, and if the pass band is unnecessarily wide, undesired noise components also pass through the filter, causing the performance in the demodulation to deteriorate. In order to prevent such a deterioration in the demodulation performance, it is necessary to keep the pass band of the interpolation filter along the frequency axis to the minimum required, and for that purpose, it is effective to perform both the optimization of timing with which the Fourier transform is performed in the Fourier transform unit 2 (hereinafter referred to as "synchronization timing") and the optimization of the pass band of the frequency interpolation filter used for the interpolation along the frequency axis. The optimization of synchronization timing can be carried out based on a time difference between the foregoing synchronization timing and the symbol position of an incoming wave that has reached the receiver device earliest or between the foregoing synchronization timing and the symbol position of the incoming wave that has reached the receiver device latest. On the other hand, the optimization of the pass band of the interpolation filter can be carried out based on the foregoing synchronization timing and the delay time of the incoming wave that has the greatest time difference from the synchronization timing. Accordingly, in the first delay profile estimation unit 7, a signal necessary for the foregoing optimization is generated. It should be noted that the amplitudes and phases of the subcarrier components that are the output from the Fourier transform unit 1 are dependent not only on the multipath in the transmission channel and the phase noise and remaining frequency errors in the receiver device but also on the timing for performing the Fourier transform.

Figure 3:
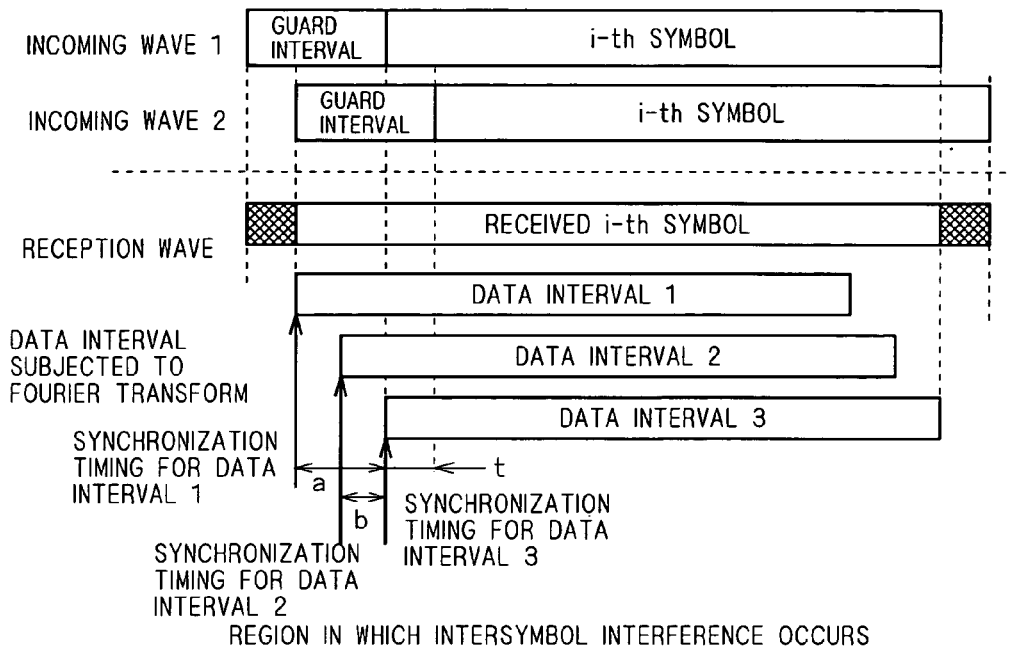
FIG. 3 show charts illustrating timing and delay time for performing Fourier transform in the demodulation device according to the first preferred embodiment of the present invention.
Figure 3:
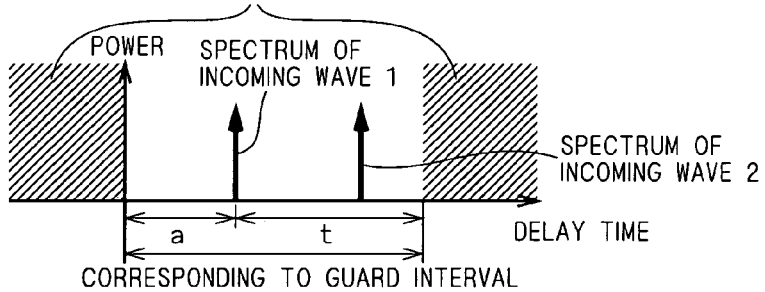
Figure 3:
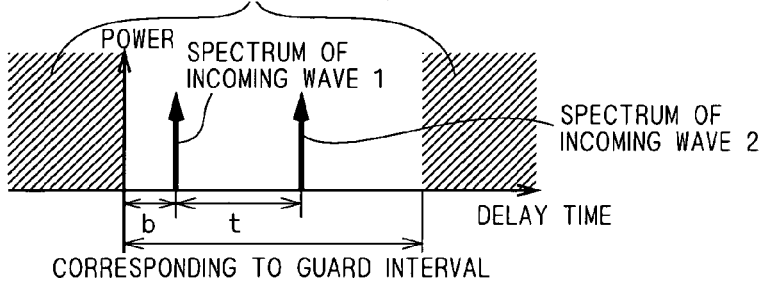
Figure 3:
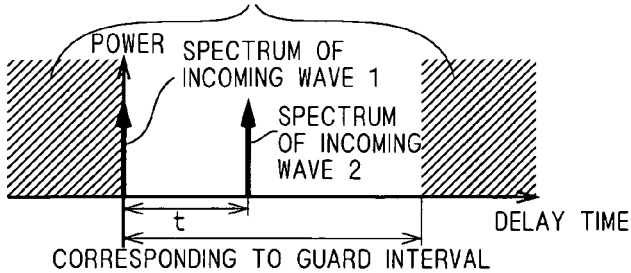

Hereinbelow, the foregoing synchronization timing and the foregoing delay time, which are the basis for the signal generated in the first delay profile estimation unit 7, are described. FIG. 3 shows charts for illustrating the foregoing synchronization timing and the foregoing delay time. For simplicity of explanation, it will be assumed in the following explanation that two incoming waves are received which have different arrival times to the receiver device (time it takes the signal transmitted from the transmission device to reach (to be received by) the receiver device). In the receiver device, the signal obtained by adding the incoming waves forms a reception wave, and therefore, it is necessary to perform a Fourier transform with such timing that interference between adjacent symbols (hereinafter also referred to as "intersymbol interference") does not occur. Accordingly, first, the timing for performing a Fourier transform, that is, setting of synchronization timing, is explained with reference to FIG. 3(a).

FIG. 3(a) shows a state in which an incoming wave 1 and an incoming wave 2, each comprising a guard interval and an i-th symbol, are received at different arrival times. It should be noted that the reception wave is illustrated in FIG. 3(a) as a signal in which the incoming wave 1 and the incoming wave 2 are added, and the front and rear shaded portions are the portions in which intersymbol interference occurs. Accordingly, the data intervals for performing a Fourier transform that do not cause interference with adjacent symbols are, for example, a data interval 1, a data interval 2, and a data interval 3, shown in FIG. 3(a). Each of the interval lengths of the data intervals 1, 2, and 3 is the symbol length to which the guard interval has not yet been added, and the starting point of the interval is determined by the synchronization timing.

For example, in the case of the data interval 1, the boundary at which intersymbol interference does not occur between the (i−1)-th symbol and the i-th symbol in the reception wave is set to be the synchronization timing. In the case of the data interval 3, the tail end of the guard interval in the incoming wave 1 is set to be the synchronization timing. The tail end of the data interval 3 is located at the boundary at which intersymbol interference does not occur between the (i+1)-th symbol and the i-th symbol in the reception wave. The synchronization timing corresponding to the data interval 2 is provided between the foregoing synchronization timing corresponding to the data interval 1 and the foregoing synchronization timing corresponding to the data interval 3. Thus, synchronization timing is not determined uniquely but is sufficient when it falls within a time range that is dependent on arrival time difference of incoming waves under the condition in which intersymbol interference does not occur. Therefore, for example, in FIG. 3(a), synchronization timing may be provided at any location as long as it is between the synchronization timing for the data interval 1 and the synchronization timing for the data interval 3.

Next, FIG. 3(b) shows a delay profile corresponding to a signal obtained by Fourier transforming the data contained in the data interval 1 in FIG. 3(a). Likewise, FIG. 3(c) shows a delay profile corresponding to a signal obtained by Fourier transforming the data contained in the data interval 2. Further, FIG. 3(d) shows a delay profile corresponding to a signal obtained by Fourier transforming the data contained in the data interval 3. In FIGS. 3(b), 3(c), and 3(d), the horizontal axis represents the tail end of the guard interval in each of the incoming waves with respect to the starting point of the data interval that undergoes a Fourier transform, that is, delay time corresponding to the front edge position of the i-th symbol, while the vertical axis represents power corresponding to incoming wave. It should be noted that although the term "delay profile" refers to information corresponding to delay wave under a multipath environment (delay time, power value, or the like), the delay time and received power corresponding to a received signal that undergoes the transmission channel from the transmission device to the output of the Fourier transform unit 1 are treated as the delay profiles in the first preferred embodiment.

In FIG. 3(b), a difference a between the synchronization timing corresponding to the data interval 1 and the tail end of the guard interval of in the incoming wave 1 becomes the delay time of the incoming wave 1 with respect to the synchronization timing, and the spectrum of the incoming wave 1 appears at the position of delay time a. Likewise, in FIG. 3(*c*), a difference b between the synchronization timing corresponding to the data interval 2 and the tail end of the guard interval in the incoming wave 1 becomes the delay time of the incoming wave 1 with respect to the synchronization timing, and the spectrum of the incoming wave 1 appears at the position of delay time b. Also, in the case of the data interval 3, since its synchronization timing matches the tail end of the guard interval in the incoming wave 1, the spectrum of the incoming wave 1 appears at the position of delay time 0, and the spectrum of the incoming wave 2 appears at the position set apart therefrom by the amount corresponding to the arrival time difference between the incoming waves (t in the figure). In the cases of the data interval 1 and the data interval 2 as well, the spectrum of the incoming wave 2 appears at the position set apart by t with respect to the spectrum of the incoming wave 1.

The first delay profile estimation unit 7 calculates delay time-to-received power corresponding to the transmission channel in which a signal corresponding to data transmitted from the transmission device reaches the output of the Fourier transform unit 1 based on the transmission channel characteristic that is output from the first divider unit 5, and based on the calculated delay time-to-received power, it outputs a signal necessary for the foregoing optimization.

Figure 4:
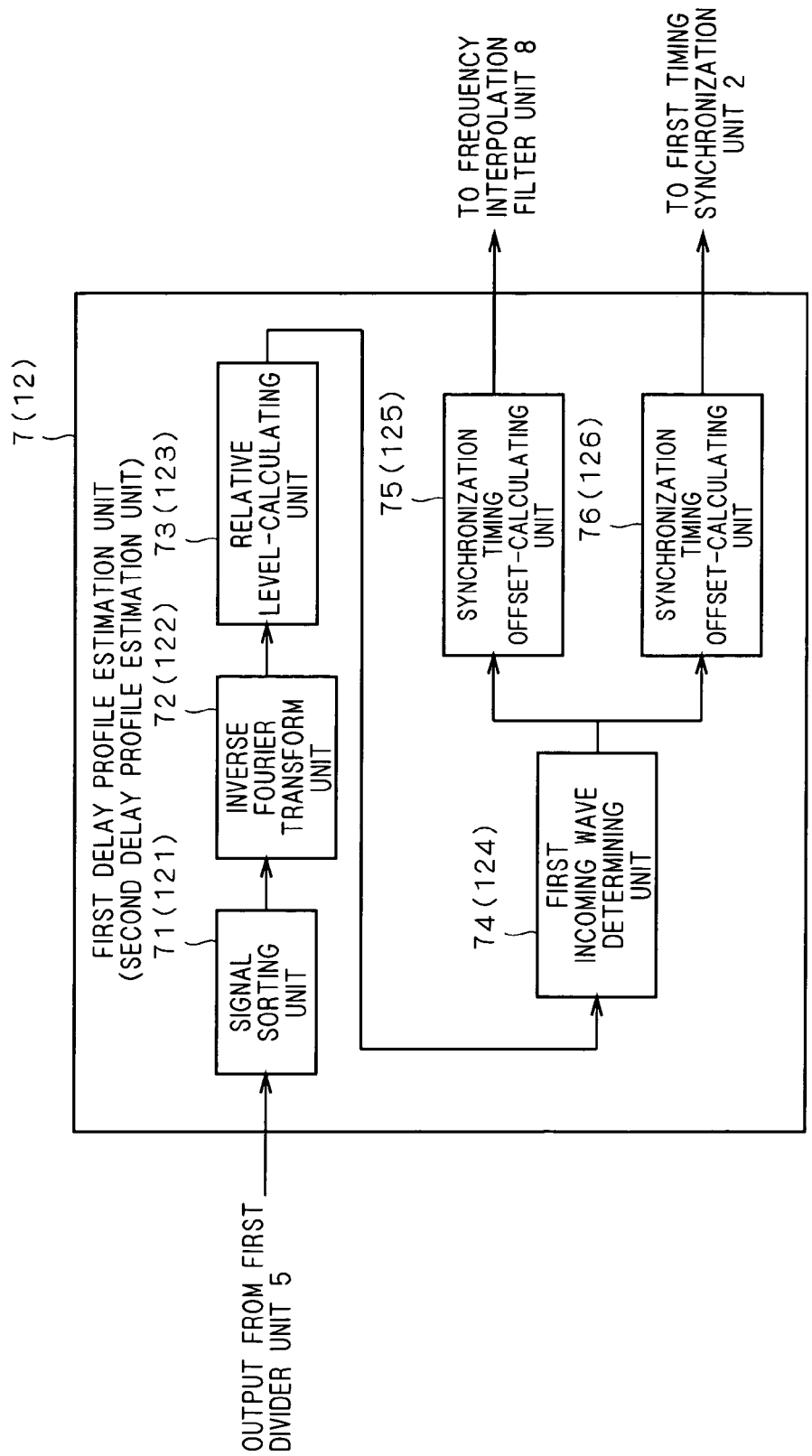
FIG. 4 is a block diagram illustrating a configuration example of a first delay profile estimation unit according to the first preferred embodiment of the present invention.

FIG. 4 is a block diagram illustrating the configuration of the first delay profile estimation unit 7 according to the present preferred embodiment. A signal sorting unit 71 sorts the transmission channel characteristics of the pilot signals that are output from the first divider unit 5 in an ascending order or in a descending order of frequency. Nevertheless, when the arrangement of the pilot signals are offset for respective symbols, as shown in the figure, the frequencies of the received pilot signals vary from a received symbol to another. Accordingly, in such a case, the frequencies of the received pilot signals are prevented from varying in the output from the signal sorting unit 71 by making use of a pilot signal that has been received prior to the currently received symbol as well. For example, if the pilot signals are arranged as shown in FIG. 2, the pilot signals for the previous four symbols including the currently received symbol are sorted. An inverse Fourier transform unit 72 performs an inverse Fourier transform on the transmission channel characteristics corresponding to the pilot signals sorted in an ascending order or a descending order of frequency, and outputs the signals corresponding to the results of the inverse Fourier transform to a relative level-calculating unit 73.

The relative level-calculating unit 73 calculates the amplitude or squared amplitude of a signal that is output from the inverse Fourier transform unit 72, that is, a signal corresponding to the transmission channel characteristics of pilot signal, and outputs the results of the calculation to a first incoming wave determining unit 74. Here, the output of the relative level-calculating unit 73, that is, the foregoing amplitude or squared amplitude, corresponds to the delay time-to-received power in the foregoing delay profile. The first incoming wave determining unit 74 determines a component having an amplitude or squared amplitude greater than a predetermined threshold value that has been specified in advance to be the component corresponding to the incoming wave, and outputs, as a delay time, a relative time difference between the synchronization timing and the position on the time axis where the component corresponding to the incoming wave exists, to a maximum delay time calculating unit 75 and to a synchronization timing offset-calculating unit 76. Nevertheless, in the first preferred embodiment, when a Fourier transform is performed with the tail end of the guard interval in the front most incoming wave (incoming wave 1 in FIG. 3(*a*)) being the synchronization timing, the front most incoming wave is detected as an incoming wave having a least delay time. In the first preferred embodiment, if there is a case in which there exists an incoming wave with a delay time with a negative value, it means that intersymbol interference is taking place with the (i+1)-th symbol.

The maximum delay time calculating unit 75 determines an incoming wave component having the greatest delay time among the delay times that are output from the first incoming wave determining unit 74, and outputs a signal corresponding to that delay time (hereinafter also referred to as "filter band-controlling signal") to the frequency interpolation filter unit 8. A synchronization timing offset-calculating unit 76 determines an incoming wave component having the least delay time among the delay times that are output from the first incoming wave determining unit 74, and outputs a signal corresponding to that delay time (hereinafter also referred to as "timing offset-adjusting signal") to the first timing synchronizing unit 2. It should be noted that the relationship between the foregoing delay time and the magnitude of the foregoing filter band-controlling signal (power value, current value, voltage value, or the like), or the relationship between the foregoing delay time and the magnitude of the foregoing timing offset-adjusting signal (power value, current value, voltage value, or the like) may be set to be in a proportional relationship.

The frequency interpolation filter unit 8 selects, based on the input filter band-controlling signal, the interpolation filter having the narrowest pass band among the filters that are necessary and sufficient for the incoming wave corresponding to the greatest delay time to pass through, for the transmission channel characteristics corresponding to the subcarrier components with the same frequency that have undergone the interpolation along the time axis in the time interpolation filter unit 6. Then, an interpolation process along the frequency axis is performed with the selected interpolation filter.

The interpolation processes in the time interpolation filter unit 6 and the frequency interpolation filter unit 8 make it possible to obtain the transmission channel characteristics for all the subcarrier components. Additionally, the above-mentioned frequency interpolation filter unit 8 may be constructed by, for example, a low-pass filter that allows low frequencies to pass through.

The first timing synchronization unit 2 generates information corresponding to timing for performing a Fourier transform according to S1 and a timing offset-adjusting signal that is output from the synchronization timing offset-calculating unit 76, and outputs a signal corresponding to the information as a timing signal to the Fourier transform unit 1.

Figure 5:
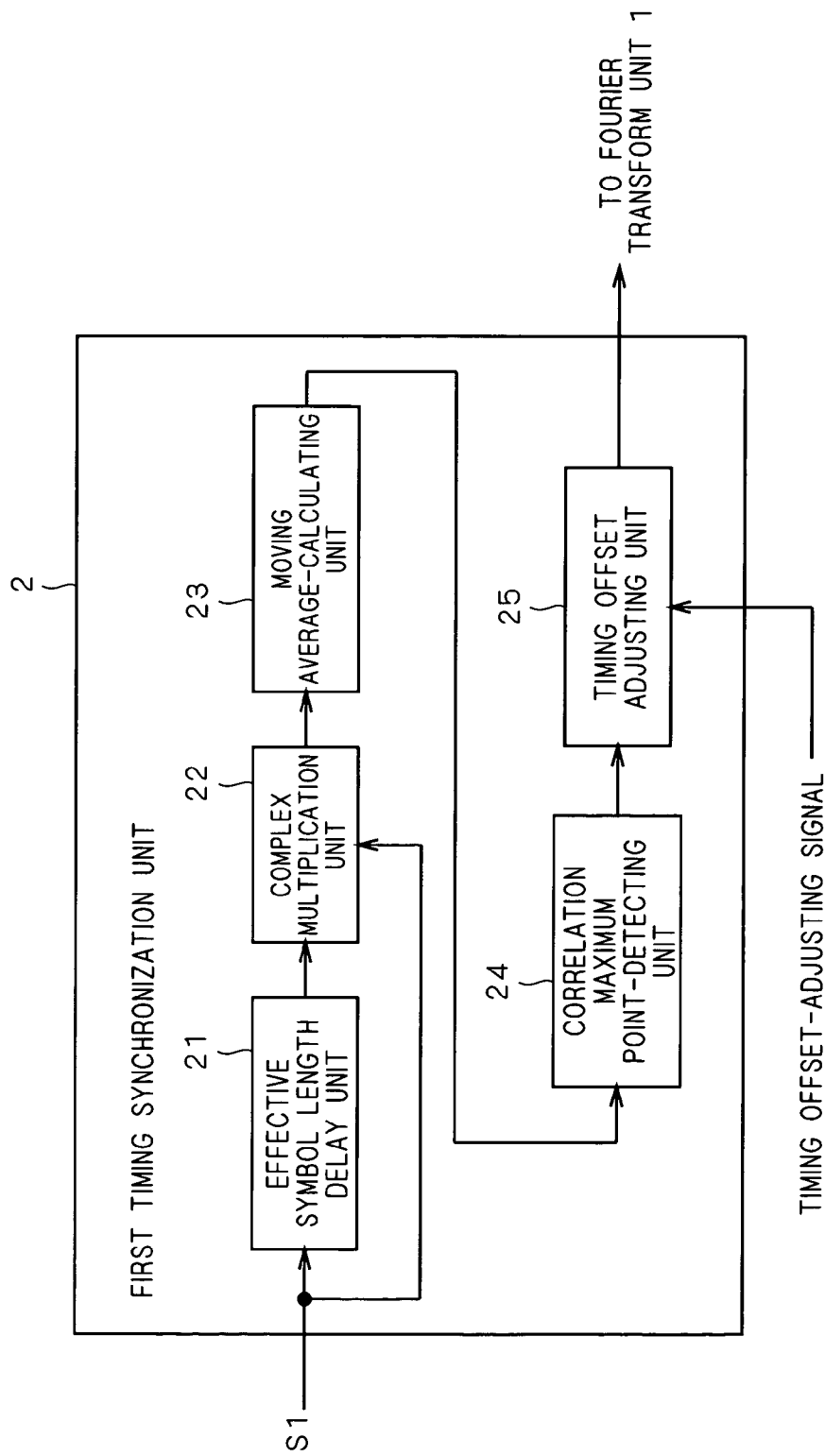
FIG. 5 is a block diagram illustrating a configuration example of a first timing synchronization unit according to the first preferred embodiment of the present invention.

FIG. 5 is a block diagram illustrating the configuration of the first timing synchronization unit 2 according to the present preferred embodiment. In the first timing synchronization unit 2, the position of the synchronization timing is reproduced by detecting the timing at which the autocorrelation of the received signal is greatest, utilizing the fact that the guard interval is a copy of a predetermined interval from the tail end of an effective symbol contained in a received signal.

The foregoing S1 is input into an effective symbol length delay unit 21 within the first timing synchronizing unit 2. The effective symbol length delay unit 21 delays the signal by the length of data interval subjected to a Fourier transform and outputs the signal to a complex multiplication unit 22. The complex multiplication unit 22 performs a complex multiplication of S1 and the complex conjugate of an output from the effective symbol length delay unit 21 and outputs a complex signal corresponding to the complex multiplication to a moving average-calculating unit 23.

The moving average-calculating unit 23 calculates a moving average value of the input complex signal for a predetermined interval length and outputs the result of the calculation to a correlation maximum point-detecting unit 24. Here, a guard interval length may be set as the predetermined interval length, for example. The correlation maximum point-detecting unit 24 detects a position at which the signal amplitude becomes greatest among the outputs from the moving average-calculating unit 23, and generates, based on the result, timing for performing a Fourier transform, that is, first timing information corresponding to the synchronization timing (hereinafter also referred to as a "first timing signal"), which is output to a timing offset adjusting unit 25. Further, the timing offset adjusting unit 25 adds an offset to the first timing signal based on the timing offset-adjusting signal that is output from the first delay profile estimation unit, and generates a timing signal, which is output to the Fourier transform unit 1. The adjustment of the first timing signal in the timing offset adjusting unit 25 is conducted so that the delay time of the front most incoming wave component is minimized under the constraint that intersymbol interference does not occur. Therefore, it is advisable that the timing offset-adjusting signal should be a signal that is in a proportional relationship with the delay time of the incoming wave component having the least delay time.

The offset is a correction amount used for canceling the shift that occurs when the first timing signal that can be arbitrarily set has shifted from that set position. The phrase "to add an offset to the first timing signal" means that the synchronization timing is manipulated to return to the set position by shifting the synchronization timing on the time axis so as to cancel the shift. The shift in synchronization timing mainly occurs due to multipath phasing.

Meanwhile, the subcarrier component of the output of the Fourier transform unit 1 is delayed by a predetermined time in the first delay adjusting unit 9 so that the subcarrier component and a signal corresponding to the foregoing subcarrier component that has undergone the processing from the pilot extracting unit 3 to the frequency interpolation filter unit 8 are input to a second divider unit 10 at the same timing, and is thereafter output to the second divider unit 10.

The second divider unit 10 divides each of the subcarrier components delayed in the first delay adjusting unit 9 by a transmission channel characteristic corresponding to the subcarrier component that is output from the frequency interpolation filter unit 8 to demodulate the subcarrier components. Lastly, a data reproduction unit 11 reproduces transmission data from the signal constellation of the subcarrier components demodulated by the second divider unit 10 and outputs the data as reproduced data (S2).

It should be noted that although the first delay profile estimation unit 7 shown in FIG. 4 is configured so that a predetermined threshold value is compared with the amplitude or squared amplitude of the inverse Fourier transform output when the incoming wave is determined in the first incoming wave determining unit 74, it is also possible to employ a configuration in which the amplitude or squared amplitude of the transmission channel characteristic having the highest level among the outputs from the relative level-calculating unit 73 is used as a reference, and an incoming wave may be determined using a value that is smaller by a predetermined level than the reference value as the threshold value. Moreover, in the present invention, it is also possible to employ a configuration in which the amplitude or squared amplitude of the transmission channel characteristic having the lowest level among the outputs from the relative level-calculating unit 73 as a reference, and an incoming wave may be determined using a value that is greater by a predetermined level than the reference value as the threshold value.

Moreover, although the first delay profile estimation unit 7 shown in FIG. 4 is configured to determine an incoming wave utilizing the amplitude or squared amplitude of an inverse Fourier transform output that is the output from the relative level-calculating unit 73 as it is in determining an incoming wave in the first incoming wave determining unit 74, it is also possible to employ a configuration in which the amplitudes or squared amplitudes that are output from the relative level-calculating unit 73 for a predetermined number of symbols are averaged for each component, and the incoming wave is determined in the first incoming wave determining unit 74. It is also possible to employ a configuration in which the amplitudes or squared amplitudes that are output from the relative level-calculating unit 73 for a predetermined number of symbols are averaged for each component, and the incoming wave is determined in the first incoming wave determining unit 74 based on the result obtained before the averaging is made when the carrier-to-noise power ratio of the subcarrier component is greater than a predetermined value, or alternatively, the incoming wave is determined in the first incoming wave determining unit 74 based on the result obtained after the averaging when the carrier-to-noise power ratio is small.

Figure 6:
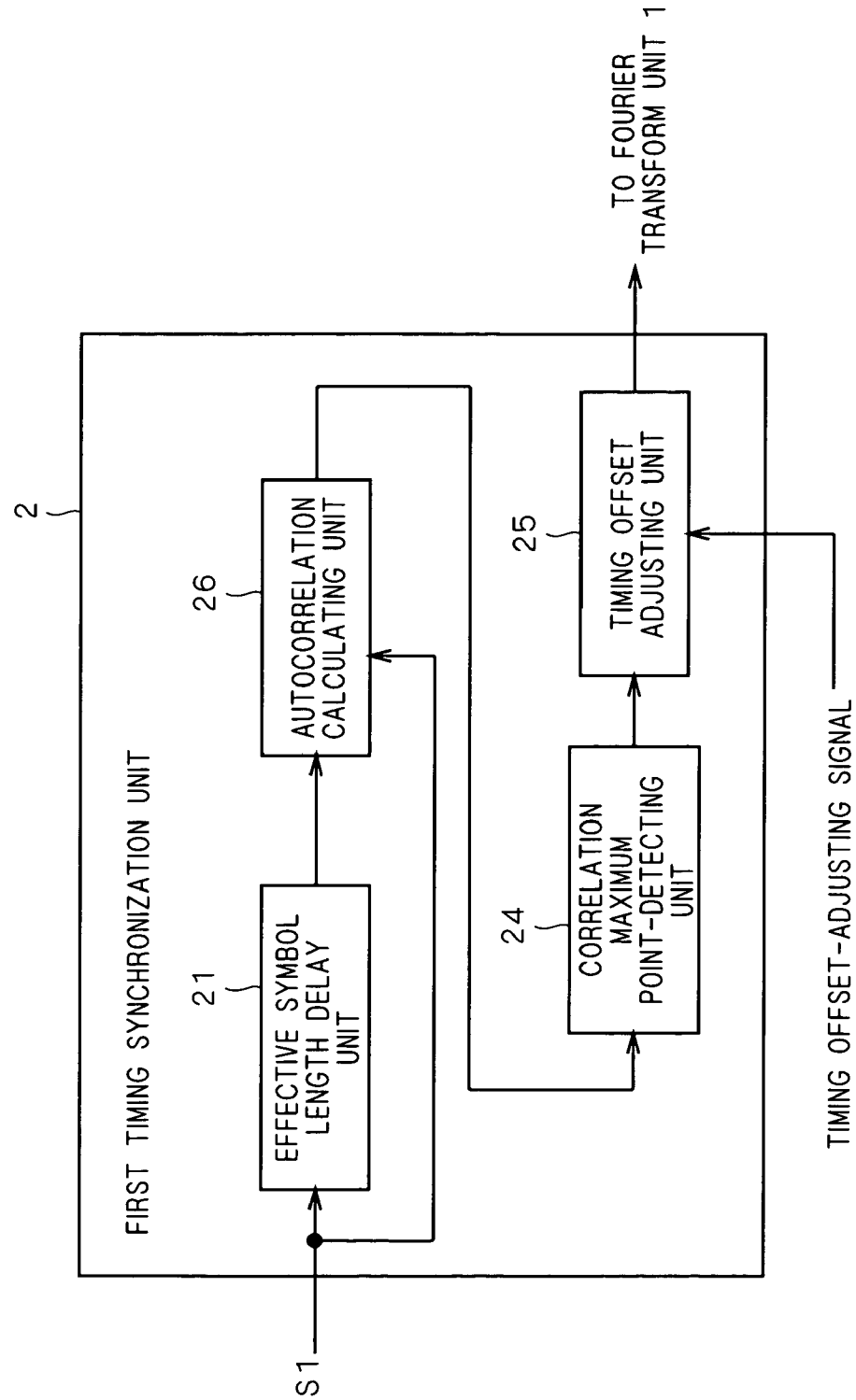
FIG. 6 is a block diagram illustrating a configuration example of a first timing synchronization unit according to the first preferred embodiment of the present invention.

Moreover, the first timing synchronization unit 2 may be configured as shown in FIG. 6. Specifically, it is possible to employ a configuration in which the autocorrelation calculating unit 26 calculates the autocorrelation of S1 and outputs a signal corresponding to the calculation result to the correlation maximum point-detecting unit 24 to detect a position at which the autocorrelation becomes greatest, whereby the first timing signal is generated based on the result.

As described above, the demodulation device of the first preferred embodiment can control the bandwidth of the frequency interpolation filter while adjusting the synchronization timing for performing a Fourier transform based on an estimated delay profile and therefore makes it possible to minimize the pass band of the interpolation filter along the frequency axis when estimating transmission channel characteristics. Therefore, it is possible to alleviate deterioration in the reception performance due to undesired noise components passing through the interpolation filter. Furthermore, since a configuration is made so that a delay profile can be estimated utilizing a pilot signal after a Fourier transform, the delay profile can be estimated with high accuracy.

Second Preferred Embodiment

The demodulation device according to the first preferred embodiment is configured to estimate delay profiles from transmission channel characteristics corresponding to pilot signals that are output from the first divider unit 5; in contrast, the present preferred embodiment is configured to estimate delay profiles based on transmission channel characteristics obtained by interpolating the transmission channel characteristics corresponding to the foregoing pilot signals along the time axis.

FIG. 7 is a block diagram illustrating the configuration of a demodulation device according to the present preferred embodiment. In FIG. 7, a Fourier transform unit 1, a first timing synchronization unit 2, a pilot extracting unit 3, a known signal generating unit 4, a first divider unit 5, a time interpolation filter unit 6, a frequency interpolation filter unit 8, a first delay adjusting unit 9, a second divider unit 10, and a data reproduction unit 11 have the same configurations as those of the demodulation unit in the first preferred embodiment; therefore, these components are designated by the same reference numerals as those of the demodulation device of the first preferred embodiment and the detailed explanations of their configurations are omitted.

The demodulation device of the second preferred embodiment is provided with a second delay profile estimation unit 12, and is not provided with the first delay profile estimation unit 7 in the first preferred embodiment. The second delay profile estimation unit 12 differs from the first delay profile estimation unit 7 in that it estimates a delay profile based on the output from the time interpolation filter unit 6, not based on the output from the first divider unit 5. The configuration of the second delay profile estimation unit 12 is, however, identical to the configuration of the first delay profile estimation unit 7 shown in FIG. 4. In the following description, the configuration of the second delay profile estimation unit 12 is explained using the reference numerals shown in the parentheses in FIG. 4.

Generally, the delay profile calculation performed based on the transmission channel characteristics that have not undergone the interpolation along the time axis is carried out for every four symbols containing a pilot signal that are lined along the time axis in FIG. 2. Therefore, if the transmission channel characteristics vary between the four symbols, the calculated delay profile contains an error based on that variation. The demodulation device in the second preferred embodiment, however, estimates a delay profile based on the transmission channel characteristics that have already undergone the interpolation along the time axis and therefore is capable of following the variation in the transmission channel characteristics along the time axis, thereby enhancing the accuracy of the calculated delay profile. As a result, the pass band of the frequency axis interpolation filter can be controlled more accurately.

In FIG. 7, the transmission line characteristic that is output from the time interpolation filter unit 6 is input into a signal sorting unit 121 in the second delay profile estimation unit 12. Then, the signal sorting unit 121 sorts the transmission line characteristics that are output from the time interpolation filter unit 6 in an ascending order or a descending order of frequency and outputs them to an inverse Fourier transform unit 122. The inverse Fourier transform unit 122 performs an inverse Fourier transform on the transmission channel characteristics that are output from the signal sorting unit 121 and outputs a signal corresponding to the result of the inverse Fourier transform to a relative level-calculating unit 123.

The relative level-calculating unit 123 calculates the amplitude or squared amplitude of a signal corresponding to each of the subcarrier components based on the signal that is output from the inverse Fourier transform unit 122, and output the results of the calculation to a first incoming wave determining unit 124. Then, the first incoming wave determining unit 124 determines, among the calculation results that are output from the relative level-calculating unit 123, a component greater than a predetermined threshold value that has been specified in advance to be an incoming wave component, and outputs, as a delay time, a relative time difference between the position on the time axis at which that component exists and the synchronization timing to a maximum delay time calculating unit 125 and to a synchronization timing offset-calculating unit 126.

Then, the incoming wave component having the greatest delay time is determined and a filter band-controlling signal is output. In addition, the synchronization timing offset-calculating unit 126 determines the incoming wave component with the least delay time among the delay times that are output from the first incoming wave determining unit 124, and outputs an timing offset-adjusting signal.

It should be noted that although the second delay profile estimation unit 12 is configured so that a predetermined threshold value is compared with the amplitude or squared amplitude of the inverse Fourier transform output when determining an incoming wave in the first incoming wave determining unit 124, it is also possible to employ a configuration in which the amplitude or squared amplitude of the transmission channel characteristics with the greatest level among the outputs from the relative level-calculating unit 123 is used as a reference, and the incoming wave is determined using a value that is smaller by a predetermined level than the reference value as the threshold value. It is also possible to employ a configuration in which the amplitude or squared amplitude of the transmission channel characteristics with the lowest level among the outputs from the relative level-calculating unit 123 is used as a reference, and the incoming wave is determined using a value that is greater by a predetermined level than the reference value as the threshold value.

Moreover, although the second delay profile estimation unit 12 is configured so that, when determining an incoming wave in the first incoming wave determining unit 124, the amplitude or squared amplitude of the inverse Fourier transform outputs, which are the output from the relative level-calculating unit 123, are utilized as they are to determine the incoming wave, it is also possible to employ a configuration in which the amplitudes or squared amplitudes of the inverse Fourier transform outputs, which are the output from the relative level-calculating unit 123, are averaged for a predetermined number of symbols for each component, and based on the result, the incoming wave is determined in the first incoming wave determining unit 124. It is also possible to employ a configuration in which the amplitudes or squared amplitudes of the inverse Fourier transform outputs, which are the output from relative level-calculating unit 123, are averaged for a predetermined number of symbols for each component, and the incoming wave is determined in the first incoming wave determining unit 124 based on the result before the averaging if the carrier-to-noise power ratio of the subcarrier component is greater than a predetermined value, while the incoming wave is determined in the first incoming wave determining unit 124 based on the result after the averaging if the carrier-to-noise power ratio is less than the predetermined value.

As described above, the demodulation device of the present preferred embodiment calculates a delay profile based on the transmission characteristic obtained after the interpolation along the time axis; therefore, delay profiles can be estimated with high accuracy even when the variation of transmission channel characteristics in terms of time is great (for example, when the receiver device is disposed in a mobile unit such as an automobile and accordingly the transmission channel characteristics change greatly in terms of time because of the high-speed movement thereof).

In addition, by carrying out the setting of the frequency interpolation filter based on the delay profile calculated in the demodulation device, the pass band of the frequency interpolation filter can be set within the minimum range required.

Third Preferred Embodiment

The demodulation devices of the foregoing first and second preferred embodiments are configured to control the frequency axis interpolation filter while adjusting the synchronization timing for performing a Fourier transform. In the present preferred embodiment, a demodulation device is configured to give a phase rotation to a subcarrier component that is output from the Fourier transform unit 1, corresponding to the frequency of the subcarrier component, and also to control the frequency axis interpolation filter.

Figure 8:
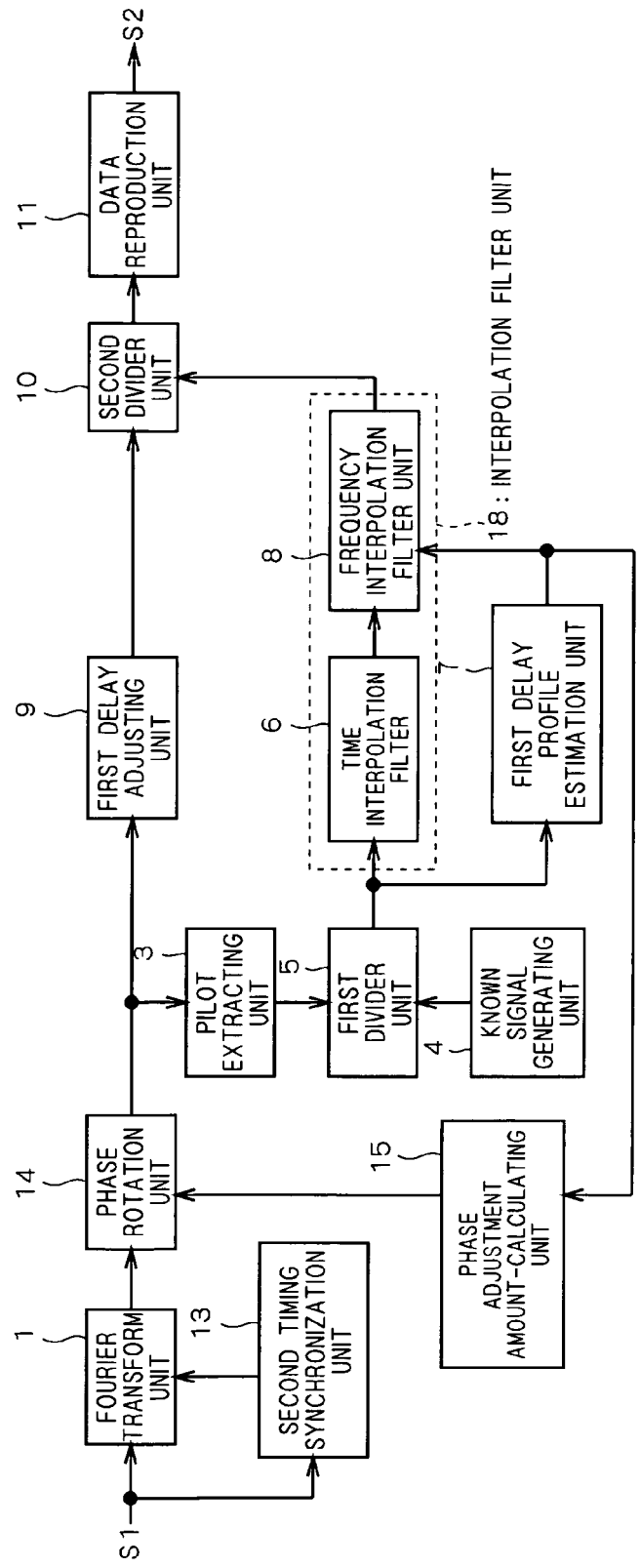
FIG. 8 is a block diagram illustrating a configuration example of a demodulation device according to a third preferred embodiment of the present invention.

FIG. 8 is a block diagram illustrating the configuration of a demodulation device according to the present preferred embodiment. In FIG. 8, a Fourier transform unit 1, a pilot extracting unit 3, a known signal generating unit 4, a first divider unit 5, a time interpolation filter unit 6, a first delay profile estimation unit 7, a frequency interpolation filter unit 8, a second divider unit 10, and a data reproduction unit 11 have the same configurations as those of the demodulation unit in the first preferred embodiment; therefore, these components are designated by the same reference numerals as those of the demodulation device of the first preferred embodiment and the detailed explanations of their configurations are omitted. A second timing synchronization unit 13 in the demodulation device of the third preferred embodiment differs from the first timing synchronization unit 2 in the first and second preferred embodiments in that it outputs a synchronization timing signal based on the S1 signal alone.

A phase rotation unit 14 rotates the phases of subcarrier components that are output from the Fourier transform unit 1 according to the output from a phase adjustment amount-calculating unit 15. At this time, the magnitude of phase rotation is in proportional to the frequency of each of the subcarrier components. In addition, the delay time of the incoming wave in the delay profile corresponding to the signal that is input to the pilot extracting unit 3 and the first delay adjusting unit 9 shifts along the time axis according to the foregoing magnitude of phase rotation. Here, the phase adjustment amount-calculating unit 15 computes the phase adjustment amount to be given to the subcarrier component in the phase rotation unit 14 based on the timing offset-adjusting signal that is output from the first delay profile estimation unit 7. Further, the first delay adjusting unit 9 delays the output from the phase rotation unit 14 by a predetermined time so that the output from the phase rotation unit 14 and the output from the frequency interpolation filter unit 8 can be input to the second divider unit 10 at the same timing.

Figure 9:
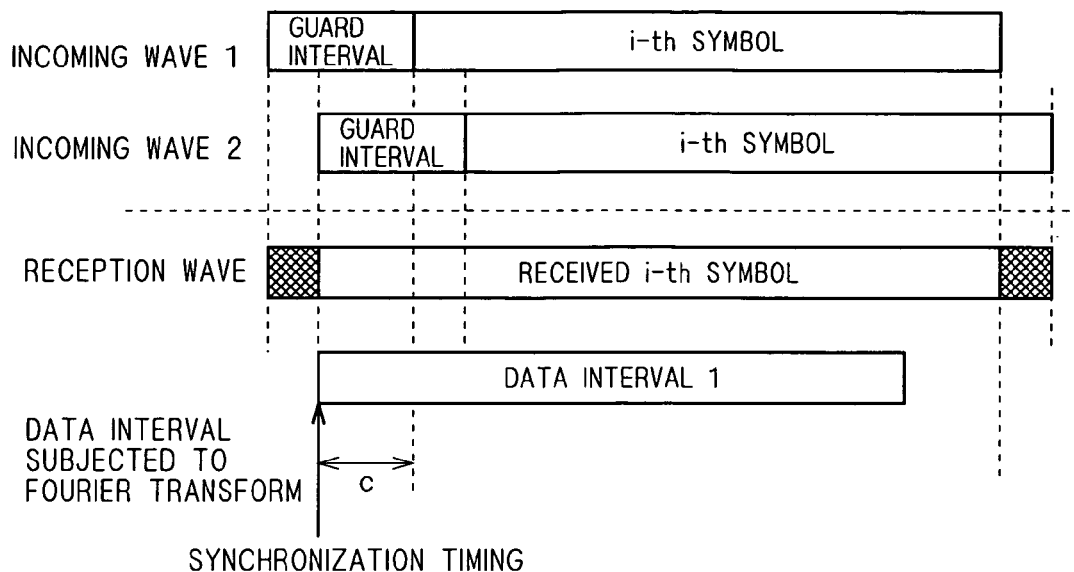
FIG. 9 show charts illustrating timing and delay time for performing Fourier transform in the demodulation device according to the third preferred embodiment of the present invention.
Figure 9:
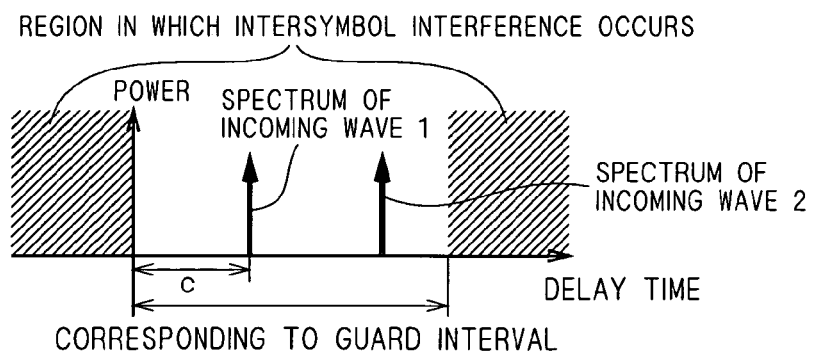
Figure 9:
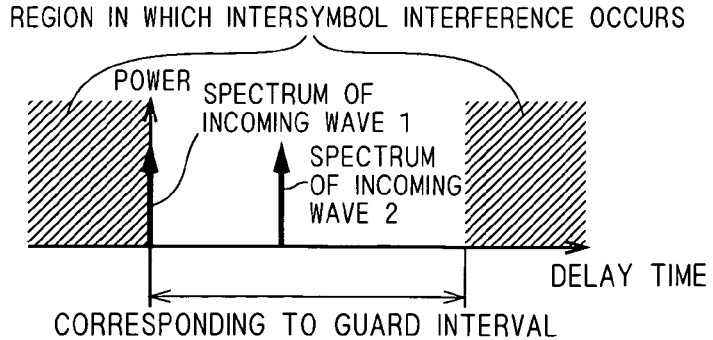

Here, the relationship between the operation of the phase rotation unit 14 and the synchronization timing in performing a Fourier transform is discussed with reference to FIG. 9. FIG. 9 is a schematic view illustrating the relationship between delay profile and timing in performing a Fourier transform in the demodulation device according to the present preferred embodiment. Specifically, FIG. 9 illustrates in the charts how the delay profile changes when a phase rotation proportional to the frequency of a subcarrier component is given to the subcarrier component. First, for simplicity of explanation, it is assumed that the receiver device receives two incoming waves that have different arrival times. As previously described, the signal obtained by adding the incoming waves forms a reception wave, and therefore, it is necessary to perform a Fourier transform with such timing that intersymbol interference does not occur.

FIG. 9(*a*) shows a state in which an incoming wave 1 and an incoming wave 2, each comprising a guard interval and an i-th symbol, are received at different arrival times. FIG. 9(*a*) also illustrates a reception wave obtained by adding the incoming wave 1 and the incoming wave 2. The front and rear shaded portions of the reception wave represent portions in which intersymbol interference occurs. The data interval with which a Fourier transform can be performed under the condition in which interference does not occur between adjacent symbols is, for example, a data interval 1 shown in FIG. 9(*a*). The position of the data interval 1 is, as already discussed in the foregoing first preferred embodiment, determined by synchronization timing, and the synchronization timing may be arbitrarily determined within the time range that is dependent on arrival time difference of incoming waves on condition that intersymbol interference does not occur. In the case of the data interval 1 in FIG. 9(*a*), the synchronization timing is provided at the boundary timing where the intersymbol interference with the (i−1)-th symbol does not occur.

Next, FIGS. 9(*b*) and 9(*c*) show the delay profiles for the signal obtained by performing a Fourier transform on the data interval 1 in FIG. 9(*a*). In FIGS. 9(*b*) and 9(*c*), the horizontal axis represents the tail end of the guard interval of each of the incoming waves with respect to the starting point of the data interval that undergoes a Fourier transform, that is, delay time of the front edge position of an i-th symbol with respect to the synchronization timing, and the vertical axis represents power corresponding to incoming waves. FIG. 9(*b*) shows a delay profile in the case in which no phase rotation is given by the phase rotation unit 14. The delay time corresponding to the incoming wave 1 is a time difference c between the synchronization timing and the tail end of the guard interval of the incoming wave 1 shown in FIG. 9(*a*).

In contrast, when a phase rotation such as to cancel the time difference c between the synchronization timing and the tail end of the guard interval of the incoming wave 1 is given to each subcarrier component that is output from the Fourier transform unit 1, the spectrum of each incoming wave shifts along the time axis according to the magnitude of the phase rotation as shown in FIG. 9(*c*), and therefore, the delay time of the incoming wave 1 can be made small. This is due to the fact that, as a feature of Fourier transform, time shift in a time domain signal is converted into phase rotation of each frequency component in the frequency domain. In other words, by giving such a phase rotation as to cancel the phase variation originating from the time shift in the frequency domain, it is possible to apparently cancel what is equivalent to the time shift of the time domain signal, and thus the delay profile in the frequency domain can be manipulated equivalently.

Therefore, the phase adjustment amount-calculating unit 15 calculates an amount of phase rotation based on the timing offset-adjusting signal, and the phase rotation unit 14 gives a phase rotation that is proportional to the frequency of each subcarrier component to the subcarrier component. The adjustment of the amount of phase rotation in the phase adjustment amount-calculating unit 15 is performed in such a fashion that the maximum delay time among the delay times corresponding to the incoming wave components is minimized under the constraints that no intersymbol interference occurs. Therefore, the timing offset-adjusting signal should be a signal that is proportional to the delay time of the incoming wave component having the most delay time.

It should be noted that such a configuration may be employed that the second delay profile estimation unit 12 illustrated in the second preferred embodiment is utilized in place of the first delay profile estimation unit 7 and the delay profile is estimated from the output of the time interpolation filter unit 6.

As described above, the demodulation device according to the third preferred embodiment makes it possible to suppress the pass band of the frequency axis interpolation filter to minimum in estimating transmission channel characteristics without changing the synchronization timing for the Fourier transform and to alleviate deterioration in reception performance originating from undesired noise components passing through the interpolation filter.

Fourth Preferred Embodiment

The foregoing demodulation device of the first preferred embodiment control the synchronization timing and the bandwidth of the frequency interpolation filter based on the delay profiles obtained based on the output of the Fourier transform unit 1 to demodulate a signal. The demodulation device according to the present preferred embodiment gives a predetermined phase rotation according to the frequency of a subcarrier component to the output of the Fourier transform unit 1 and controls the synchronization timing and the bandwidth of the frequency interpolation filter based on the delay profile corresponding to the signal that has undergone the phase rotation to carry out signal demodulation.

Figure 10:
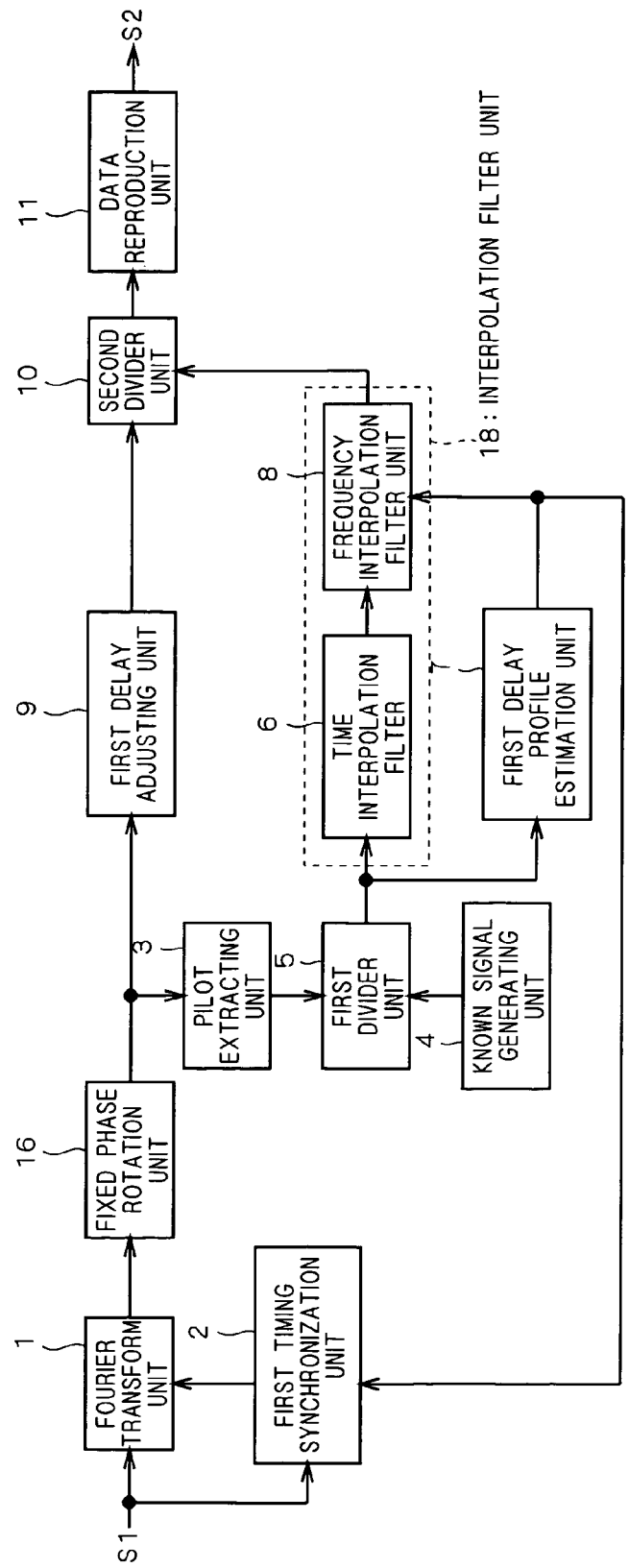
FIG. 10 is a block diagram illustrating a configuration example of a demodulation device according to a fourth preferred embodiment of the present invention.

FIG. 10 is a block diagram illustrating the configuration of a demodulation device according to the present preferred embodiment. In FIG. 10, a Fourier transform unit 1, a first timing synchronization unit 2, a pilot extracting unit 3, a known signal generating unit 4, a first divider unit 5, a time interpolation filter unit 6, a frequency interpolation filter unit 8, a second divider unit 10, and a data reproduction unit 11 have the same configuration as those of the demodulation device in the first preferred embodiment; therefore, these components are designated by the same reference numerals as those of the demodulation device of the first preferred embodiment and the detailed explanations of their configurations are omitted. In the demodulation device of the present preferred embodiment, a fixed phase rotation unit 16 is provided downstream of the Fourier transform unit 1, and the fixed phase rotation unit 16 gives a fixed amount of phase rotation proportional to the frequency of a subcarrier component that is output from the Fourier transform unit 1 to the subcarrier component. In addition, the first delay adjusting unit 9 delays the output from the fixed phase rotation unit 16 by a predetermined time so that the output from the fixed phase rotation unit 16 and the output from the frequency interpolation filter unit 8 are input to the second divider unit 10 at the same timing.

The synchronization timing for a Fourier transform is determined so that intersymbol interference does not occur; however, in order to make the bandwidth of the frequency interpolation filter of the demodulation device in the first preferred embodiment narrowest, it is necessary to provide the synchronization timing to be at the tail end of the guard interval of the front most incoming wave. In this case, since the synchronization timing matches the boundary at which intersymbol interference occurs, a very little shift in the synchronization timing can cause intersymbol interference, increasing the error rate obtained after the demodulation.

Figure 11:
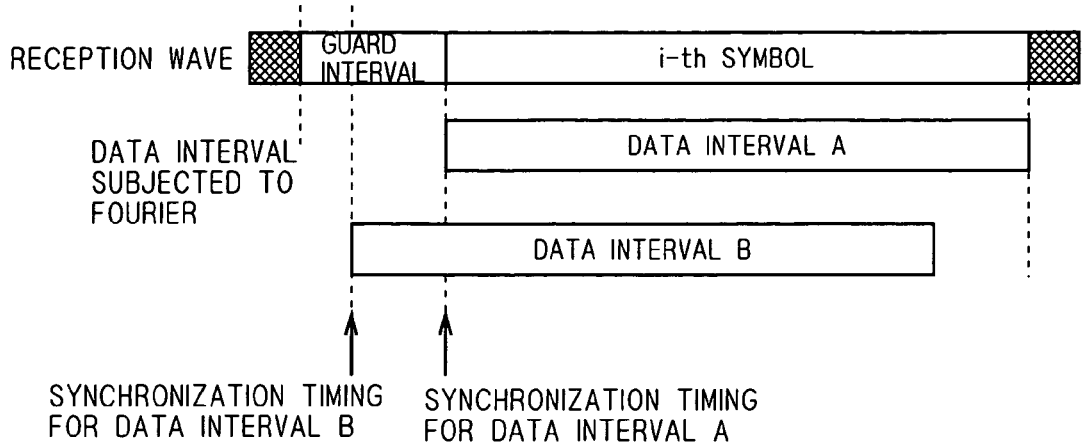
FIG. 11 is a chart for illustrating timing and delay time for performing Fourier transform in the demodulation device according to the fourth preferred embodiment of the present invention.

For example, consider the case of the reception wave as illustrated in FIG. 11. First, in the case of the synchronization timing for performing a Fourier transform on the data interval A, no intersymbol interference will occur if the synchronization timing shifts to the left in the figure, but intersymbol interference will occur at the tail end of the data interval A if the synchronization timing shifts to the right in the figure. In contrast, when synchronization timing is located at a position ahead (to the left of the figure) by half the duration of the guard interval from the synchronization timing for the data interval A (in the case of the synchronization timing for performing a Fourier transform on the data interval B), no intersymbol interference will occur even if the synchronization timing shifts to a certain extent either to the right or to the left of the figure. That is, it is possible to lessen the frequency of occurrence of intersymbol interference due to jitter or error in synchronization timing.

In other words, in order to prevent intersymbol interference from occurring, jitter of synchronization timing and erroneous detection of synchronization timing can be dealt with by shifting the synchronization timing frontward of a symbol. Nevertheless, the fact that it is necessary to shift synchronization timing frontward of a symbol means that sufficient narrowing of the bandwidth of the frequency interpolation filter cannot be achieved.

Taking the frequency interpolation filter in the demodulation device of the first preferred embodiment as a filter for limiting the bandwidth of time signal, the frequency interpolation filter will have the narrowest bandwidth when it is a complex filter that passes only the positive frequency components. In other words, in this case, the necessary condition is that the frequency interpolation filter is a complex filter. On the other hand, when the frequency interpolation filter is not a complex filter, it results in such a filter whose pass band is symmetrical with respect to the zero frequency, although reduction in the circuit scale may be possible; therefore, the pass band has twice a bandwidth of the desired bandwidth, and sufficient narrowing of the band cannot be achieved.

In contrast, the demodulation device of the present preferred embodiment is configured so that first synchronization timing is set to be shifted ahead by half the guard interval length with respect to the tail end of the guard interval in an incoming wave corresponding to the largest power, and a predetermined phase rotation is given to the output of the Fourier transform unit 1 based on the guard interval length and the subcarrier component frequency.

Specifically, the fixed phase rotation unit 16 in the demodulation device of the present preferred embodiment gives a fixed amount of phase rotation to a subcarrier component that is output from the Fourier transform so as to cancel the time corresponding to the frontward shift in terms of time (to the left in FIG. 11) of the position of the synchronization timing. This makes it possible to prevent intersymbol interference due to the shifts in synchronization timing and jitter.

Figure 12:
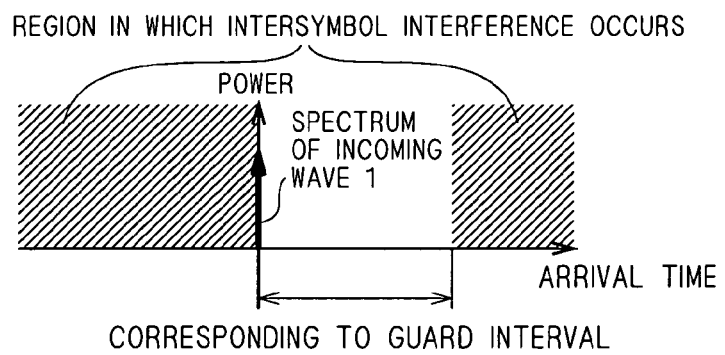
FIG. 12 show schematic charts illustrating delay profiles in the demodulation devices according to the first to fourth preferred embodiments of the present invention.
Figure 12:
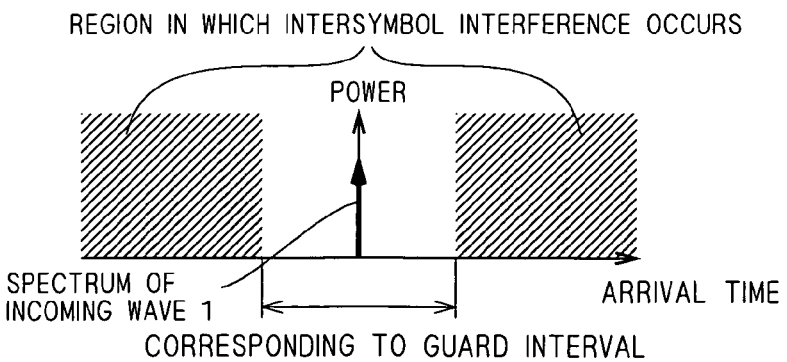

Further in this case, with the delay profile of the transmission channel characteristics in the output of the first divider unit 5, intersymbol interference does not necessarily occur even when there exists an incoming wave the delay time of which is a negative value, FIG. 12 illustrates an example of such a case. FIG. 12 shows a schematic view of a delay profile in the case where there is one incoming wave.

In FIG. 12, the delay profile in A represents a delay profile obtained in the case of the demodulation device in the first preferred embodiment, and the delay profile in B represents a delay profile obtained in the case of the demodulation device in the present preferred embodiment. FIG. 12 indicates that intersymbol interference occurs in the output of the Fourier transform unit 1 when an incoming wave exists in the hatched regions of the figures, that is, in intersymbol interference occurrence regions. As seen from FIG. 12B, even when there exists an incoming wave obtained as having a negative delay time value, the incoming wave does not exist in the intersymbol interference occurrence regions in the demodulation device according to the present preferred embodiment. It should be noted that although the horizontal axis in FIG. 12 is similar to the one showing delay time in FIGS. 3 and 9, it is indicated as arrival time for convenience of explanation because both positive and negative values are possible when it represents delay time.

Thus, it is sufficient in the demodulation device of the present preferred embodiment that the arrival time of an incoming wave should exist within a symmetrical region with respect to the arrival time zero position, ant that the pass band of the frequency interpolation filter should be a low-pass filter that has the narrowest pass band among those that can pass the incoming wave within the region. Accordingly, taking the frequency interpolation filter as a filter for limiting the bandwidth of time signal, the frequency interpolation filter will have the narrowest band when it is a complex filter whose pass band is asymmetrical with respect to the zero frequency; however, as with the demodulation device according to the present preferred embodiment, when the synchronization timing is set so that the spectrum corresponding to the incoming wave with the greatest arrival time and the spectrum corresponding to the incoming wave with the least arrival time are symmetrical with respect to the arrival time zero position in the delay profile, the frequency interpolation filter has a pass band that is symmetrical with respect to the zero frequency and therefore need not be a complex filter, so sufficient narrowing of bandwidth is possible with a smaller scale circuit in comparison with the demodulation device of the first preferred embodiment.

Therefore, the timing offset-adjusting signal that is input to the first timing synchronization unit 2 is given as a signal proportional to ½ of the sum (average value) of the arrival time of the incoming wave having the greatest arrival time and the arrival time of the incoming wave having the least arrival time under the condition in which intersymbol interference does not occur. The filter band-controlling signal is given as a signal proportional to the absolute value of the arrival time of the incoming wave having the greatest absolute value of arrival time. Then, the frequency interpolation filter unit 8 determines an interpolation filter according to the foregoing filter band-controlling signal.

It should be noted that such a configuration may also be employed that the second delay profile estimation unit 12 illustrated in the second preferred embodiment is utilized in place of the first delay profile estimation unit 7 and the delay profile is estimated from the output of the time interpolation filter unit 6. In addition, the first timing synchronization unit 2 may control the synchronization timing signal by controlling the operation clock of analog/digital conversion for generating S1.

Furthermore, although in the demodulation device in the present fourth preferred embodiment, the starting point of a Fourier transform, that is, the first synchronization timing is set to be at a midpoint in the guard interval, the first synchronization timing may be at any position as long as the position is shifted from the tail end of the guard interval toward the front edge of the guard interval (to the left from the tail end of the guard interval in FIG. 11) and the amount of phase rotation may be determined according to the position thereof.

Moreover, in the demodulation device of the fourth preferred embodiment, the first synchronization timing is set so as to be at a midpoint of the guard interval as described above, but the ratio of guard interval length and effective symbol interval length may be used as a parameter in the setting in this case. It should be noted that a digital terrestrial TV system in Japan adopts ¼, ⅛, ¹⁄₁₆, and ¹⁄₃₂ as the foregoing ratios.

As has been described above, in the demodulation device of the fourth preferred embodiment, the first synchronization timing is controlled so as to be located ahead of the tail end of the guard interval in the incoming wave having the largest power by half the guard interval length, and a predetermined phase rotation according to the guard interval length and the subcarrier frequency is given to a Fourier transform output; therefore, it is possible to give a fixed amount of phase rotation such as to cancel the time corresponding to the frontward shift of the synchronization timing position to the subcarrier component that has undergone the Fourier transform. Moreover, intersymbol interference due to jitter of synchronization timing or erroneous detection can be prevented, and at the same time, the bandwidth of the frequency interpolation filter can be narrowed with small-scale circuits. Furthermore, it is possible to alleviate deterioration in reception performance originating from undesired noise components that pass through the interpolation filter.

It should be noted that although the demodulation devices according to the third and the fourth preferred embodiments are configured including the first delay profile 7, the foregoing second delay profile estimation unit 12 may be utilized in place of the first delay profile estimation unit 7.

While the invention has been shown and described in detail, the foregoing description is in all aspects illustrative and not restrictive. It is therefore understood that numerous other modifications and variations can be devised without departing from the scope of the invention.

What is claimed is:

1. A demodulation device comprising:
 a Fourier transform unit for performing a Fourier transform on a received OFDM signal to output a subcarrier component obtained as a result of the Fourier transform;
 a pilot signal-extracting unit for extracting a pilot signal contained in said subcarrier component output from said Fourier transform unit;
 a known signal outputting unit for outputting a known signal corresponding to said pilot signal;
 a first divider unit for dividing said pilot signal extracted in said pilot signal-extracting unit by said known signal output from said known signal outputting unit to calculate a transmission channel characteristic corresponding to said pilot signal;
 a delay profile estimation unit for estimating a delay profile based on said transmission channel characteristic of said pilot signal calculated in said first divider unit, and outputting a signal corresponding to a maximum delay time that is an arrival time of a most delayed incoming wave and a signal corresponding to a minimum delay time that is an arrival time of a front most incoming wave in said delay profile estimation;
 an interpolation filter unit for performing interpolation on said transmission channel characteristic of said pilot signal calculated in said first divider unit along a time axis and along a frequency axis, and outputting a transmission channel characteristic corresponding to said subcarrier component;
 a timing synchronization unit for outputting a timing signal that controls timing for performing said Fourier transform in said Fourier transform unit according to said signal corresponding to said minimum delay time output from said delay profile estimation unit; and
 a second divider unit for dividing said subcarrier component output from said Fourier transform unit by said transmission channel characteristic corresponding to said subcarrier component output from said interpolation filter unit, to output a demodulated signal, wherein
 said Fourier transform unit performs said Fourier transform according to said timing signal; and
 said interpolation filter unit sets a pass band of a frequency interpolation filter used for said frequency axis interpolation based on said signal corresponding to said maximum delay time.

2. A demodulation device comprising:
a Fourier transform unit for performing a Fourier transform on a received OFDM signal to output a subcarrier component obtained as a result of the Fourier transform;
a phase rotation unit for rotating a phase corresponding to said subcarrier component output from said Fourier transform unit by an amount of phase rotation determined based on a guard interval length of said OFDM signal and a frequency of said subcarrier component;
a pilot signal-extracting unit for extracting a pilot signal from said subcarrier component the phase of which has been rotated by said phase rotation unit;
a known signal outputting unit for outputting a known signal corresponding to said pilot signal;
a first divider unit for dividing said pilot signal output from said pilot signal-extracting unit by said known signal output from said known signal outputting unit to calculate a transmission channel characteristic corresponding to said pilot signal;
a delay profile estimation unit for estimating a delay profile based on said transmission channel characteristic of said pilot signal output from said first divider unit, and outputting a signal corresponding to an average value of a maximum delay time that is an arrival time of a most delayed incoming wave and a minimum delay time that is a front most incoming wave in said delay profile estimation;
an interpolation filter unit for performing interpolation on said transmission channel characteristic of said pilot signal calculated in said first divider unit along a time axis and along a frequency axis, and outputting a transmission channel characteristic corresponding to said subcarrier component;
a timing synchronization unit for outputting a timing signal that controls timing for performing said Fourier transform in said Fourier transform unit based on said signal corresponding to said average value output from said delay profile estimation unit; and
a second divider unit for dividing said subcarrier component the phase of which has been rotated in said phase rotation unit by said transmission channel characteristic corresponding to said subcarrier component output from said interpolation filter unit to output a demodulated signal, wherein
said Fourier transform unit performs said Fourier transform according to said timing signal; and
said interpolation filter unit sets a pass band of a frequency interpolation filter used for said frequency axis interpolation based on said maximum delay time.

3. The demodulation device according to claim 1, wherein:
said timing synchronization unit comprises:
an autocorrelation calculating unit for calculating and outputting an autocorrelation of said OFDM signal based a guard interval in said received OFDM signal;
a correlation maximum point-detecting unit for detecting a maximum value of output from said autocorrelation calculating unit and generating a first timing signal for controlling timing of said Fourier transform based on said maximum value; and
a timing offset adjusting unit for adding an offset to said first timing signal according to said signal corresponding to said minimum delay time and outputting said timing signal.

4. The demodulation device according to claim 2, wherein:
said timing synchronization unit comprises:
an autocorrelation calculating unit for calculating and outputting an autocorrelation of said OFDM signal based a guard interval in said received OFDM signal;
a correlation maximum point-detecting unit for detecting a maximum value of output from said autocorrelation calculating unit and generating a first timing signal for controlling timing of said Fourier transform based on said maximum value; and
a timing offset adjusting unit for adding an offset to said first timing signal based on said signal corresponding to said average value, and outputting said timing signal.

5. The demodulation device according to claim 1, wherein:
said timing synchronization unit comprises:
an effective symbol length delay unit for delaying said received OFDM signal by a data interval length subjected to said Fourier transform and outputting a delayed OFDM signal;
a complex multiplication unit for calculating a complex multiplication of said OFDM signal and a complex conjugate signal of said delayed OFDM signal and a complex signal corresponding to a result of the calculation;
a moving average-calculating unit for calculating a moving average for a predetermined interval length of said complex signal output from said complex multiplication unit;
a correlation maximum point-detecting unit for detecting, based on a signal output from said moving average-calculating unit, a position in said predetermined interval length at which an amplitude of said complex signal becomes maximum, and generating a first timing signal for controlling timing of said Fourier transform based on said position; and
a timing offset adjusting unit for adding an offset to said first timing signal based on said signal corresponding to said minimum delay time, and outputting said timing signal.

6. The demodulation device according to claim 2, wherein:
said timing synchronization unit comprises:
an effective symbol length delay unit for delaying said received OFDM signal by a data interval length subjected to said Fourier transform and outputting a delayed OFDM signal;
a complex multiplication unit for calculating a complex multiplication of said OFDM signal and a complex conjugate signal of said delayed OFDM signal and a complex signal corresponding to a result of the calculation;
a moving average-calculating unit for calculating a moving average for a predetermined interval length of said complex signal output from said complex multiplication unit;
a correlation maximum point-detecting unit for detecting, based on a signal output from said moving average-calculating unit, a position in said predetermined interval length at which an amplitude of said complex signal becomes maximum, and generating a first timing signal for controlling timing of said Fourier transform based on said position; and
a timing offset adjusting unit for adding an offset to said first timing signal based on said signal corresponding to said average value, and outputting said timing signal.

7. A demodulation device comprising:
a Fourier transform unit for performing a Fourier transform on a received OFDM signal to output a subcarrier component obtained as a result of the Fourier transform;
a phase rotation unit for rotating and outputting a phase of said subcarrier component output from said Fourier transform unit;

a pilot signal-extracting unit for extracting a pilot signal contained in said subcarrier component output from said phase rotation unit;

a known signal outputting unit for outputting a known signal corresponding to said pilot signal;

a first divider unit for dividing said pilot signal extracted in said pilot signal-extracting unit by said known signal output from said known signal outputting unit to calculate a transmission channel characteristic corresponding to said pilot signal;

a delay profile estimation unit for estimating a delay profile based on said transmission channel characteristic of said pilot signal output from said first divider unit, and outputting a signal corresponding to a maximum delay time that is an arrival time of a most delayed incoming wave and a signal corresponding to a minimum delay time that is an arrival time of a front most incoming wave in said delay profile estimation;

an interpolation filter unit for interpolating said transmission channel characteristic calculated by said first divider unit along a time axis and a frequency axis to output a transmission channel characteristic corresponding to said subcarrier component;

a phase adjustment amount-calculating unit for outputting an amount of phase rotation in said phase rotation unit according to said signal corresponding to said minimum delay time output from said delay profile estimation unit; and a second divider unit for dividing said sub carrier component the phase of which has been rotated in said phase rotation unit by a transmission channel characteristic corresponding to said sub carrier component output from said interpolation filter unit to output a demodulated signal, wherein said phase rotation unit rotates the phase of said subcarrier component by the amount of phase rotation output from said phase adjustment amount-calculating unit; and said interpolation filter unit sets a pass band of a frequency interpolation filter used for said frequency axis interpolation based on said signal corresponding to said maximum delay time.

8. The demodulation device according to claim 1, wherein said delay profile estimation unit outputs said signal corresponding to said maximum delay time and said signal corresponding to said minimum delay time based on a transmission channel characteristic after said transmission channel characteristic corresponding to a pilot signal has been interpolated along the time axis.

9. The demodulation device according to claim 2, wherein said delay profile estimation unit outputs said signal corresponding to said maximum delay time and said signal corresponding to said minimum delay time based on a transmission channel characteristic after said transmission channel characteristic corresponding to a pilot signal has been interpolated along the time axis.

10. The demodulation device according to claim 7, wherein said delay profile estimation unit outputs said signal corresponding to said maximum delay time and said signal corresponding to said minimum delay time based on a transmission channel characteristic after said transmission channel characteristic corresponding to a pilot signal has been interpolated along the time axis.

11. The demodulation device according to claim 1, wherein:

said delay profile estimation unit comprises:

a signal sorting unit for sorting said transmission channel characteristics that have been input in an ascending order or a descending order of frequency and outputting said transmission channel characteristics;

an inverse Fourier transform unit for performing an inverse Fourier transform on said transmission channel characteristics output from said signal sorting unit and outputting a signal corresponding to a result of said inverse Fourier transform;

a relative level-calculating unit for calculating and outputting an electric power value in said delay profile based on an amplitude of said signal output from said inverse Fourier transform unit;

an incoming wave determining unit for determining a component corresponding to said power value to be a component corresponding to an incoming wave if said power value output from said relative level-calculating unit is equal to or greater than a predetermined threshold value, and outputting, as a delay time of said incoming wave, a time difference between timing for performing a Fourier transform in said Fourier transform unit and a tail end of a guard period in said incoming wave;

a maximum delay time calculating unit for outputting, as said signal corresponding to said maximum delay time, a signal corresponding to an arrival time of a most delayed incoming wave among said delay time output from said incoming wave determining unit; and a synchronization timing offset-calculating unit for outputting, as said signal corresponding to said minimum delay time, a signal corresponding to an arrival time of a front most incoming wave among said delay time output from said incoming wave determining unit.

12. The demodulation device according to claim 2, wherein:

said delay profile estimation unit comprises:

a signal sorting unit for sorting said transmission channel characteristics that have been input in an ascending order or a descending order of frequency and outputting said transmission channel characteristics;

an inverse Fourier transform unit for performing an inverse Fourier transform on said transmission channel characteristics output from said signal sorting unit and outputting a signal corresponding to a result of said inverse Fourier transform;

a relative level-calculating unit for calculating and outputting an electric power value in said delay profile based on an amplitude of said signal output from said inverse Fourier transform unit;

an incoming wave determining unit for determining a component corresponding to said power value to be a component corresponding to an incoming wave if said power value output from said relative level-calculating unit is equal to or greater than a predetermined threshold value, and outputting, as a delay time of said incoming wave, a time difference between timing for performing a Fourier transform in said Fourier transform unit and a tail end of a guard period in said incoming wave;

a maximum delay time calculating unit for outputting, as said signal corresponding to said maximum delay time, a signal corresponding to an arrival time of a most delayed incoming wave among said delay time output from said incoming wave determining unit; and a synchronization timing offset-calculating unit for outputting, as said signal corresponding to said minimum delay time, a signal corresponding to an arrival time of a front most incoming wave among said delay time output from said incoming wave determining unit.

13. The demodulation device according to claim 7, wherein:

said delay profile estimation unit comprises:

a signal sorting unit for sorting said transmission channel characteristics that have been input in an ascending order or a descending order of frequency and outputting said transmission channel characteristics;

an inverse Fourier transform unit for performing an inverse Fourier transform on said transmission channel characteristics output from said signal sorting unit and outputting a signal corresponding to a result of said inverse Fourier transform;

a relative level-calculating unit for calculating and outputting an electric power value in said delay profile based on an amplitude of said signal output from said inverse Fourier transform unit;

an incoming wave determining unit for determining a component corresponding to said power value to be a component corresponding to an incoming wave if said power value output from said relative level-calculating unit is equal to or greater than a predetermined threshold value, and outputting, as a delay time of said incoming wave, a time difference between timing for performing a Fourier transform in said Fourier transform unit and a tail end of a guard period in said incoming wave;

a maximum delay time calculating unit for outputting, as said signal corresponding to said maximum delay time, a signal corresponding to an arrival time of a most delayed incoming wave among said delay time output from said incoming wave determining unit; and a synchronization timing offset-calculating unit for outputting, as said signal corresponding to said minimum delay time, a signal corresponding to an arrival time of a front most incoming wave among said delay time output from said incoming wave determining unit.

14. The demodulation device according to claim 1, wherein said relative level-calculating unit calculates a delay time-to-signal power value based on an amplitude or squared amplitude of a signal output from said inverse Fourier transform unit and outputs said delay time-to-signal power value as said power value.

15. The demodulation device according to claim 2, wherein said relative level-calculating unit calculates a delay time-to-signal power value based on an amplitude or squared amplitude of a signal output from said inverse Fourier transform unit and outputs said delay time-to-signal power value as said power value.

16. The demodulation device according to claim 7, wherein said relative level-calculating unit calculates a delay time-to-signal power value based on an amplitude or squared amplitude of a signal output from said inverse Fourier transform unit and outputs said delay time-to-signal power value as said power value.

17. A demodulation method comprising:

a Fourier transform step of performing a Fourier transform on a received OFDM signal to output a subcarrier component obtained as a result of the Fourier transform;

a pilot signal-extracting step of extracting a pilot signal contained in said subcarrier component output in said Fourier transform step;

a known signal outputting step of outputting a known signal corresponding to said pilot signal;

a first division step of dividing said pilot signal extracted in said pilot signal-extracting step by said known signal output in said known signal outputting step to calculate a transmission channel characteristic corresponding to said pilot signal;

a delay profile estimation step of estimating a delay profile based on said transmission channel characteristic of said pilot signal calculated in said first division step, and outputting a signal corresponding to an average value of a maximum delay time that is an arrival time of a most delayed incoming wave and a minimum delay time that is a front most incoming wave in said delay profile estimation;

an interpolation step of performing interpolation along a time axis and along a frequency axis based on said transmission channel characteristic of said pilot signal calculated in said first division step, and outputting a transmission channel characteristic corresponding to said sub carrier component;

a timing synchronization step of outputting a timing signal for controlling timing of said Fourier transform in said Fourier transform step according to a signal corresponding to said minimum delay time output in said delay profile estimation step; and a second division step of dividing said subcarrier component output in said Fourier transform step by said transmission channel characteristic corresponding to said subcarrier component output in said interpolation step to output a demodulated signal, wherein said Fourier transform in said Fourier transform step is performed according to said timing signal; and in said interpolation step, a pass band of a frequency interpolation filter used for said frequency axis interpolation is set based on said signal corresponding to said maximum delay time.

18. A demodulation method comprising:

a Fourier transform step of performing a Fourier transform on a received OFDM signal to output a subcarrier component obtained as a result of the Fourier transform;

a phase rotation step of rotating a phase corresponding to said subcarrier component output in said Fourier transform step by an amount of phase rotation determined based on a guard interval length of said OFDM signal and a frequency of said subcarrier component;

a pilot signal-extracting step of extracting a pilot signal from said subcarrier component the phase of which has been rotated in said phase rotation step;

a known signal-outputting step of outputting a known signal corresponding to said pilot signal;

a first division step of dividing said pilot signal output in said pilot signal-extracting step by said known signal output in said known signal outputting step to calculate a transmission channel characteristic corresponding to said pilot signal;

a delay profile estimation step of estimating a delay profile based on said transmission channel characteristic of said pilot signal output in said first division step, and outputting a signal corresponding to an average value of a maximum delay time that is an arrival time of a most delayed incoming wave and a minimum delay time that is a front most incoming wave in said delay profile estimation;

an interpolation step of performing interpolation on said transmission channel characteristic of said pilot signal calculated in said first division step along a time axis and along a frequency axis, and outputting a transmission channel characteristic corresponding to said sub carrier component;

a timing synchronization step of outputting a timing signal that controls timing for performing said Fourier transform in said Fourier transform step based on said signal corresponding to said average value output in said delay profile estimation step; and a second division step of dividing said sub carrier component the phase of which has been rotated in said phase rotation step by said transmission channel characteristic corresponding to said subcarrier component output from said interpolation step to output a demodulated signal, wherein in said Fourier transform step, said Fourier transform is performed according to said timing signal; and in said interpolation step, a pass band of a frequency interpolation filter used for said frequency axis interpolation is set based on said maximum delay time.

19. A demodulation method comprising:

a Fourier transform step of performing a Fourier transform on a received OFDM signal to output a subcarrier component obtained as a result of the Fourier transform;

a phase rotation step of rotating and outputting a phase of said subcarrier component output in said Fourier transform step;

a pilot signal-extracting step of extracting a pilot signal contained in said subcarrier component output in said phase rotation step;

a known signal outputting step of outputting a known signal corresponding to said pilot signal;

a first division step of dividing said pilot signal extracted in said pilot signal-extracting step by said known signal output from said known signal outputting step to calculate a transmission channel characteristic corresponding to said pilot signal;

a delay profile estimation step of estimating a delay profile based on said transmission channel characteristic of said pilot signal output in said first division step, and outputting a signal corresponding to a maximum delay time that is an arrival time of a most delayed incoming wave and a signal corresponding to a minimum delay time that is an arrival time of a front most incoming wave in said delay profile estimation;

an interpolation step of interpolating said transmission channel characteristic calculated in said first division step along a time axis and a frequency axis to output a transmission channel characteristic corresponding to said subcarrier component;

a phase adjustment amount-calculating step of outputting an amount of phase rotation in said phase rotation step according to said signal corresponding to said minimum delay time output from said delay profile estimation step; and a second division step of dividing said subcarrier component the phase of which has been rotated in said phase rotation step by a transmission channel characteristic corresponding to said sub carrier component output in said interpolation step to output a demodulated signal, wherein in said phase rotation step, the phase of said subcarrier component is rotated by said amount of phase rotation output in said phase adjustment amount-calculating step; and in said interpolation step, a pass band of a frequency interpolation filter used for said frequency axis interpolation is set based on said signal corresponding to said maximum delay time.

* * * * *